(12) United States Patent  
Mohan et al.

(10) Patent No.: US 9,006,996 B2
(45) Date of Patent: Apr. 14, 2015

(54) DISTRIBUTED LIGHTING CONTROL

(75) Inventors: Tanuj Mohan, Mountain View, CA (US); Premal Ashar, Sunnyvale, CA (US); David Perkins, San Carlos, CA (US)

(73) Assignee: enLighted, Inc., Sunnyvale, CA (US)

( * ) Notice: Subject to any disclaimer, the term of this patent is extended or adjusted under 35 U.S.C. 154(b) by 373 days.

(21) Appl. No.: 13/556,442

(22) Filed: Jul. 24, 2012

(65) Prior Publication Data

US 2012/0299485 A1    Nov. 29, 2012

Related U.S. Application Data

(63) Continuation-in-part of application No. 12/639,303, filed on Dec. 16, 2009, now Pat. No. 8,344,660.

(51) Int. Cl.
*H05B 37/02*     (2006.01)

(52) U.S. Cl.
CPC ........ *H05B 37/0227* (2013.01); *H05B 37/0218* (2013.01); *H05B 37/0245* (2013.01); *Y02B 20/46* (2013.01)

(58) Field of Classification Search
USPC .......................... 315/291, 307, 308, 312, 360
See application file for complete search history.

(56) References Cited

U.S. PATENT DOCUMENTS

| | | | |
|---|---|---|---|
| 5,101,141 A | 3/1992 | Warner et al. |
| 5,179,324 A | 1/1993 | Audbert |
| 5,191,265 A | 3/1993 | D'Aleo et al. |
| 5,283,516 A | 2/1994 | Lohoff |
| 5,812,422 A | 9/1998 | Lyons |
| 6,057,654 A | 5/2000 | Cousy et al. |
| 6,188,181 B1 | 2/2001 | Sinha et al. |
| 6,342,994 B1 | 1/2002 | Cousy et al. |
| 6,548,967 B1 | 4/2003 | Dowling et al. |
| 7,309,985 B2 | 12/2007 | Eggers et al. |
| 7,348,736 B2 | 3/2008 | Piepgras et al. |
| 7,382,271 B2 | 6/2008 | McFarland |
| 7,437,596 B2 | 10/2008 | McFarland |
| 7,550,931 B2 | 6/2009 | Lys et al. |
| 7,566,137 B2 | 7/2009 | Veskovic |
| 7,623,042 B2 | 11/2009 | Huizenga |
| 7,792,956 B2 | 9/2010 | Choong et al. |

(Continued)

FOREIGN PATENT DOCUMENTS

WO       WO2012109696        8/2012

OTHER PUBLICATIONS

PCT Notification of Transmittal of the International Search Report and the Written Opinion of the International Searching Authority, or the Declaration, International Application No. PCT/US2014/022154, Dated Jun. 26, 2014.

*Primary Examiner* — Jimmy Vu
(74) *Attorney, Agent, or Firm* — Brian R. Short

(57) ABSTRACT

Apparatuses, methods and systems for controlling a luminaire are disclosed. One embodiment includes a lighting control sub-system. The lighting control sub-system includes a luminaire, a controller coupled to the luminaire, and a sensor coupled to the controller. The sensor generates a sensed input. The lighting control sub-system further includes a communication interface, wherein the communication interface couples the controller to an external device. The controller is operative to control a light output of the luminaire based at least in part on the sensed input, and to communicate at least one of state or sensed information to the external device.

45 Claims, 15 Drawing Sheets

(56) References Cited

U.S. PATENT DOCUMENTS

| | | |
|---|---|---|
| 7,925,384 B2 | 4/2011 | Huizenga et al. |
| 8,368,310 B1 | 2/2013 | Roosli |
| 2004/0002792 A1 | 1/2004 | Hoffknecht |
| 2005/0169643 A1 | 8/2005 | Franklin et al. |
| 2006/0275040 A1 | 12/2006 | Franklin et al. |
| 2007/0057807 A1 | 3/2007 | Walters et al. |
| 2007/0061050 A1 | 3/2007 | Hoffknecht |
| 2007/0086128 A1 | 4/2007 | Lane et al. |
| 2007/0215794 A1 | 9/2007 | Cernasov et al. |
| 2007/0291483 A1* | 12/2007 | Lys .............................. 362/227 |
| 2008/0185597 A1 | 8/2008 | Wu |
| 2008/0244104 A1 | 10/2008 | Clemente |
| 2008/0265796 A1 | 10/2008 | Null |
| 2009/0026966 A1 | 1/2009 | Budde et al. |
| 2009/0179596 A1 | 7/2009 | Willaert et al. |
| 2009/0195161 A1 | 8/2009 | Lane et al. |
| 2010/0034386 A1 | 2/2010 | Choong et al. |
| 2010/0135186 A1 | 6/2010 | Choong et al. |
| 2010/0244706 A1 | 9/2010 | Steiner et al. |
| 2010/0258682 A1* | 10/2010 | Fries et al. ..................... 246/1 C |
| 2010/0264846 A1 | 10/2010 | Chemal et al. |
| 2010/0270933 A1 | 10/2010 | Chemal et al. |
| 2010/0295482 A1 | 11/2010 | Chemal et al. |
| 2010/0301777 A1 | 12/2010 | Kraemer |
| 2011/0031897 A1 | 2/2011 | Henig et al. |
| 2012/0074852 A1 | 3/2012 | Delnoij |
| 2012/0086363 A1 | 4/2012 | Golding |

* cited by examiner

DISTRIBUTED LIGHTING CONTROL

RELATED APPLICATIONS

This patent application is a continuation-in-part (CIP) of U.S. patent application Ser. No. 12/639,303 filed Dec. 16, 2009, which is herein incorporated by reference.

FIELD OF THE EMBODIMENTS

The described embodiments relate generally to lighting. More particularly, the described embodiments relate to distributed lighting control.

BACKGROUND

Lighting control systems automate the operation of lighting within a building or residence based upon, for example, preset time schedules and/or occupancy and/or daylight sensing. The Lighting systems typically employ occupancy sensors and/or daylight sensors to determine which lighting devices to activate, deactivate, or adjust the light level of, and when to do so. Occupancy sensors typically sense the presence of one or more persons within a defined area and generate signals indicative of that presence. Daylight sensors typically sense the amount of daylight present within a defined area and generate signals indicative of that amount. Typically, lighting systems receive the sensor signals at a central lighting controller.

The lighting systems are advantageous because they typically reduce energy costs by automatically lowering light levels or turning off devices and appliances when not needed, and they can allow all devices in the system to be controlled from one location.

Centrally controlled lighting systems can be disadvantageous because all decision making occurs at the controller. Therefore, if the controller becomes inoperative, all lighting devices in the system are no longer under automated control and some or all may not operate even manually. Similarly, if a connection to or from the controller is severed, the lighting devices served by that connection are no longer under automated control and also may not operate manually. Partial or system-wide functional changes, such as an immediate need to override current system settings (for example, during a fire or other emergency), cannot be made from anywhere but the controller. Additionally, centrally-controlled systems are limited in their ability to be scaled. That is, it is not easy to add new lighting devices to a centrally-controlled system.

It is desirable to have a method, system and apparatus for providing lighting devices that can be independently controllable, or controlled.

SUMMARY

One embodiment includes a lighting control sub-system. The lighting control sub-system includes a luminaire, a controller coupled to the luminaire, and a sensor coupled to the controller. The sensor generates a sensed input. The lighting control sub-system further includes a communication interface, wherein the communication interface couples the controller to an external device. The controller is operative to control a light output of the luminaire based at least in part on the sensed input, and to communicate at least one of state or sensed information to the external device.

Another embodiment includes a lighting control system. The lighting control system includes a plurality of sub-systems, wherein each sub-system includes a luminaire, a controller coupled to the luminaire, and at least one sensor coupled to the controller. The at least one sensor generates a sensed input. Each sub-system further includes a communication interface, wherein the communication interface couples the controller to an external device. Each of the controllers is operative to control a light output of the luminaire, and communicate at least one of state or sensed information to at least one of a central controller or another sub-system.

Another embodiment includes a lighting control system. The lighting control system includes a plurality of sub-systems, wherein two or more sub-systems capable of acting as a group, and wherein each sub-system capable of independent action. Each of the sub-systems includes a luminaire, a controller electrically connected to said luminaire, said controller operative to control the light output of said luminaire and to communicate with other sub-systems, and, at least one sensor connected to said controller.

Another embodiment includes a lighting control system for integration with existing luminaires. The lighting control system includes a controller coupled to a luminaire, a sensor coupled to the controller, the sensor generating a sensed input, and a communication interface, wherein the communication interface couples the controller to an external device. Each controller is operative to control a light output of the luminaire, and communicate at least one of state or sensed information to the external device.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 9 is a time-line that shows an example of a sequence of timing events as one of the independently controllable lights is powered on.

DETAILED DESCRIPTION

Figure 1:
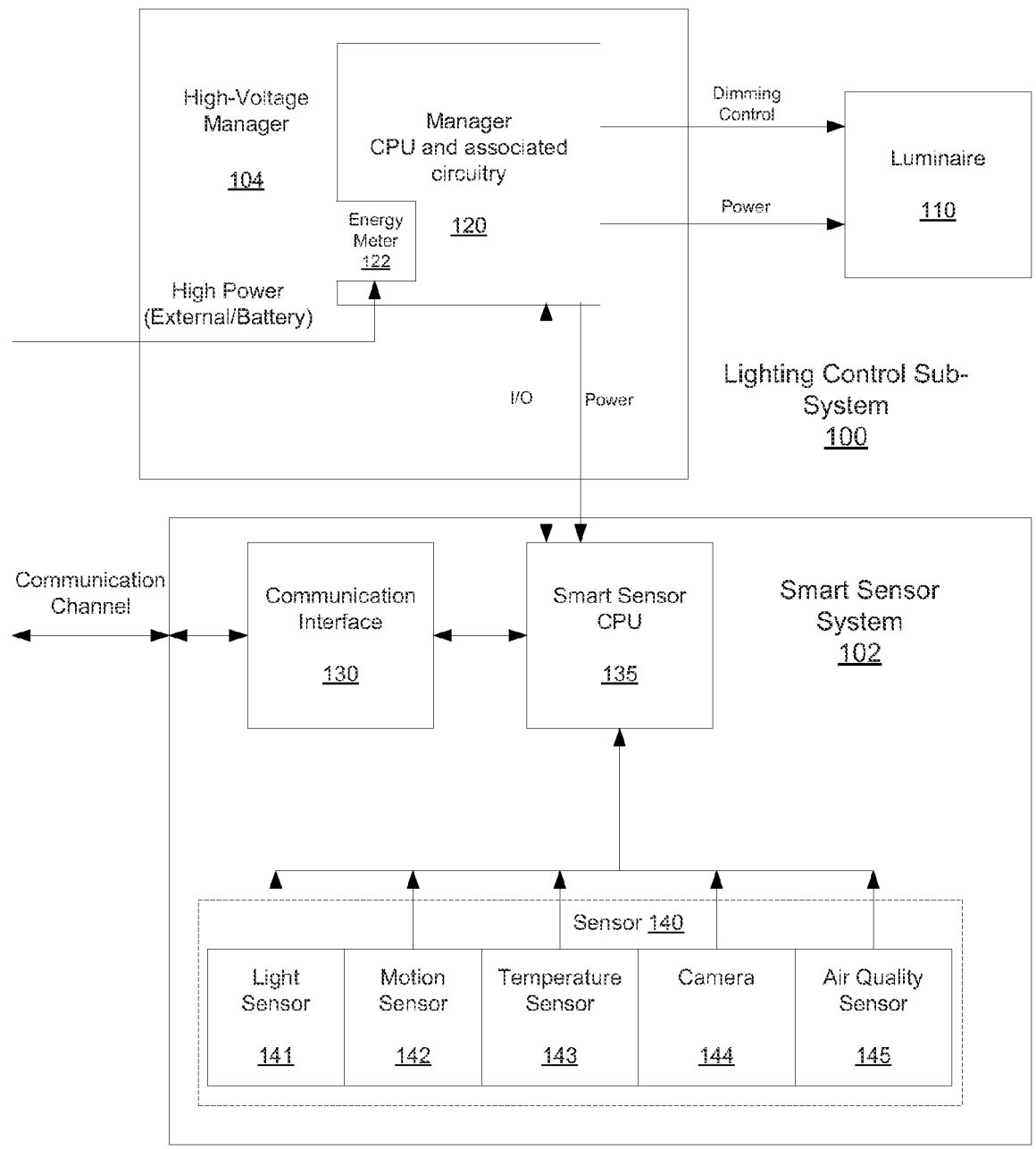
FIG. 1 shows a lighting control sub-system, according to an embodiment.

As shown in the drawings, the described embodiments are embodied in an apparatus and method for providing independently controllable lights (lighting sub-systems). At least some embodiments of the independently controllable lights each include a controller, an actuator and sensors. These configurations provide advantages over conventional centrally controlled lighting control system that include distributed sensors.

FIG. 1 shows a lighting control sub-system 100, according to an embodiment. The exemplary lighting control sub-system 100 includes a smart sensor system 102 that is interfaced with a high-voltage manager 104, which is interfaced with a luminaire 110. The high-voltage manager 104 includes a controller (manager CPU) 120 that is coupled to the luminaire 110, and to a smart sensor CPU 135 of the smart sensor system 102. As shown, the smart sensor CPU 135 is coupled to a communication interface 130, wherein the communication interface 130 couples the controller to an external device. The smart sensor system 102 additionally includes a sensor 140. As indicated, the sensor can include one or more of a light sensor 141, a motion sensor 142, and temperature sensor 143, and camera 144 and/or an air quality sensor 145. It is to be understood that this is not an exhaustive list of sensors. That is additional or alternate sensors can be utilized for lighting and/or environmental control of a structure that utilizes the lighting control sub-system 100. The sensor 140 is coupled to the smart sensor CPU 135, and the sensor 140 generates a sensed input.

According to at least some embodiments, the controllers (manager CPU 120 and the smart sensor CPU) are operative to control a light output of the luminaire 110 based at least in part on the sensed input, and communicate at least one of state or sensed information to the external device.

For at least some embodiments, the high-voltage manager 104 receives the high-power voltage and generates power control for the luminaire 110, and generates a low-voltage supply for the smart sensor system 102. As suggested, the high-voltage manager 104 and the smart sensor system 102 interact to control a light output of the luminaire 110 based at least in part on the sensed input, and communicate at least one of state or sensed information to the external device. The high-voltage manager 104 and the smart sensor system 102 can also receive state or control information from the external device, which can influence the control of the light output of the luminaire 110. While the manager CPU 120 of the high-voltage manager 104 and the smart sensor CPU 135 of the smart sensor system 102 are shown as separate controllers, it is to be understood that for at least some embodiments the two separate controllers (CPUs) 120, 135 can be implemented as single controller or CPU.

For at least some embodiments, the communication interface 130 provides a wireless link to external devices (for example, a central controller and/or other lighting sub-systems).

An embodiment of the high-voltage manager 104 of the lighting control sub-system 100 further includes an energy meter 122 (also referred to as a power monitoring unit), which receives the electrical power of the lighting control sub-system 100. The energy meter 122 measures and monitors the power being dissipated by the lighting control sub-system 100. For at least some embodiments, the monitoring of the dissipated power provides for precise monitoring of the dissipated power. Therefore, if the manager CPU 120 receives a demand response (typically, a request from a power company that is received during periods of high power demands) from, for example, a power company, the manager CPU 120 can determine how well the lighting control sub-system 100 is responding to the received demand response. Additionally, or alternatively, the manager CPU 120 can provide indications of how much energy (power) is being used, or saved.

For the embodiments described, the lighting control system includes a plurality of the lighting control sub-system, such as the lighting control sub-system 100 of FIG. 1. Generally, the purpose of the lighting control system is to control illumination so that the appropriate illumination is provided only when and where it is needed within a building or structure in which the lighting system is located. Ideally, the lighting control system operates at the lowest cost over the lifetime of the lighting control system. The costs include both the installation (generally referred to as the CAPEX (capital expenditure)) and the ongoing operational cost (generally referred to as the OPEX (operational expenditure)), which includes the energy costs and the maintenance costs (such as bulb replacement, inspection), and operation of a central controller. The actual illumination needs generally changes over the lifetime of the lighting control system due to changing building occupancy levels and usage, and by changes in occupant needs. A building that is expected to see changes in illumination needs, requires a lighting control system that provides low cost changes to reduce the total cost and to extend its lifetime. Additionally, as the technology of luminaires changes over time, the ideal lighting control system supports replacement of the luminaires without the need to replace components of the lighting control system. While lowering the costs, the ideal lighting control system should enhance occupant productivity, well-being, and security. Also, the ideal system should gather operational status and statistics so that the actual operation can be compared with the desired operation, and the design assumptions (such as occupancy patterns) can be validated, and the configuration changed, if needed, when the design is changed to match the actual use.

At least some embodiments of the lighting control system include a plurality of the lighting control sub-system. Each of the lighting control sub-systems can operate independently, in coordination with other lighting control sub-systems (for example, existing hard-wired systems), and/or in coordination with a central controller. As such, each of the lighting control sub-systems can be independently installed, and adapt their operation accordingly.

As previously stated, an embodiment of the lighting control sub-system includes a communication interface, a controller (listed in discussion as a single controller, but as previously described, at least some embodiment include multiple controllers, such as, the high-voltage manager 104 and the smart sensor, CPU 135), a luminaire, a light sensor, and a motion sensor. For an embodiment, the luminaire is a lighting unit consisting of one or more lamps, socket(s) and parts that hold the lamp(s) in place and protect them, wiring that connects the lamp(s) to a power source, and reflector(s) to help direct and distribute the light. Various embodiments of luminaires include bulb technologies, such as incandescent, florescent, and LED (light emitting diode). Further, various embodiments of the luminaires are controllably turned on and off and further, are controllably dimmable.

For at least some embodiments, the controller makes decisions as to turning on, turning off, and dimming the luminaires. The controller does this, for example, either due to command from an external device (such as, the central controller), or by processing decision rules using inputs from the sensors, a saved configuration, time of day, passage of time from past sensor inputs, and/or from state or sensor values from other sub-systems. Additionally or alternatively, learned behavior can influence the decisions.

In its most basic configuration, the controller only controls turning at least one luminaire on or off (no dimming) using simple rules and only inputs from a motion and light sensor and passage of time. For an embodiment, the controller is split into two physical modules as shown in FIG. 1. The first module is called the powerpack (referred to as the high-voltage manager 104), and contains the following sub-modules: power transformer (AC to DC voltage), relay to disrupt power to the luminaire, power meter, one model sends dimming control signal (and other model passes a dimming control signal) to the luminaire, and "watch dog" support to restart the other module of the controller if it becomes unresponsive. The second module (referred to as the smart system 102) houses the motion, and temperature sensors, a processor, persistent storage for configuration, and the wireless interface. The processor in this module executes the rules for controlling the light level of the luminaire.

For an embodiment, the controller is co-located with the luminaire. Also, at least some embodiments of the luminaire have chambers wherein the controller can be housed, or are designed for an external chamber to be attached that can house the controller.

For at least some embodiments, the controller intercepts power sources going to the luminaire and provides on/off controlled power. An embodiment of the controller also provides a 0 to 10 v control signal to the luminaire, and if supported by the luminaire, for dimming.

For at least some embodiments, the sensors sense (or measures) some physical quantity and converts it into a digital value. For an embodiment, the sensors are packaged together with the controller. More specifically, for various embodiments of the lighting control sub-system, multiple sensors of the lighting control sub-system include a motion sensor, alight sensor, and temperature sensors located in the same physical module, which is connected to the other physical modules with a cable. For an embodiment, the sensor(s) are physically located beside the luminaire, and the motion and light sensors are directed towards the floor of a structure in which the lighting control sub-system is located. For an embodiment, the sensor(s) are directly connected to the controller.

For an embodiment, the controller is further operative to receive information from an external device, wherein the received information influences a current state of the lighting control sub-system, or the received information includes parameters that influence a future state of the lighting control sub-system. For an embodiment, the received information influences alighting control sub-system profile. For an embodiment, the lighting sub-system profile includes a set of values (parameters) that affect the operation of the controller in determining how it controls the light output of the luminaire based on current and past sensor inputs, time of day or passage of time. For at least some embodiments, the parameters are adaptively updated.

For at least some embodiments, the controller is operative to receive a plurality of lighting control sub-system profiles. That is, there can be more than one lighting control sub-system profile, and the lighting control sub-system profiles can be adaptively updated. More specifically, an active profile or present profile of the plurality of lighting control sub-system profiles can be adaptively updated. Further, for at least some embodiments, the external device can add, replace or delete one or more profiles of the plurality of lighting control sub-system profiles.

As previously stated, the external device can be a central controller or another lighting control sub-system. Further, the external device can include a logical group controller, or a terminal. For at least some embodiments, a terminal is a device that allows interaction with the lighting control sub-system in a form that can be done by humans in a language that is human readable.

An embodiment of a logical group controller provides control over a plurality of lighting control sub-systems, wherein the plurality of lighting control sub-systems are all a member of the logical group. The size of a logical group is dynamic. Further, any one of the lighting control sub-systems can be member of any number of logical groups, wherein each logical group can include a different set of members. For an embodiment, the external device looks like a traditional light wall switch but with several buttons or controls. The external device is used to affect all lighting control sub-systems in the logical group to turn them on or off, and/or to set them to configured light levels that are appropriate for the use of the space in which the logical group of lighting control sub-systems is located. For example, such as viewing output from a projector on a screen, or listening to a formal presentation.

At least some embodiments include a plurality of sensors, wherein the controller is operative to control the light output based on a combination of sensed inputs of the plurality of sensors. The sensors can include, for example, ambient light sensors and occupancy sensors. Additionally, timing and scheduling controls can be provided by clocks and/or timers. At least some embodiments further include the controller operative to control the light output based on the combination of one or more of the sensed inputs and a lighting schedule. For example, during a work time (known occupancy of, for example, an office building) a light in a work area may be restricted from turning off. However, during non-work times, the light can be turned off if no one is present. If utilizing a lighting schedule, clearly the lighting control sub-system includes and/or has access to a clock and/or a timer.

For at least some embodiments, the controller is operative to receive a lighting control configuration. For an embodiment, the lighting control configuration includes the above-described lighting sub-system profile. For an embodiment, the controller receives the lighting control configuration from a system operator. This includes (but is not limited to), for example, a situation where an operator sets the configuration using dip switches that are physically located on the sub-system. For an embodiment, the controller receives the lighting control configuration from a central controller, thereby allowing a system user to manage the lighting control configuration.

For an embodiment, the controller is operative to collect sensor values over time based on at least the sensed input. Again, the controller has access to a clock and/or a timer. For an embodiment, the controller is operative to communicate the collected sensor values to the external device. For example, a value of occupancy can be determined every X seconds, saved for the last Y minutes, and then reported to the external device or central controller. For an embodiment, the controller is operative to identify problems of operation of the lighting control sub-system based on the collected sensor values, and to report the identified problems of operation to the external device. For example, the controller can report that the temperature is too high or too low. The controller can report that a light has burned out, or report a loss of coupling with the luminaire. For at least some embodiments, the controller is operative to report past operating characteristics of the sub-system. For example, the controller can report light level changes.

For at least some embodiments, the sensor includes a power monitoring unit such as, the energy meter 122) operative to measure power usage of the lighting control sub-system. Further, for at least some embodiments, the controller is operative to communicate the measured power usage of the sub-system to the external device.

As will be described in detail, for at least some embodiments, the controller is operative to communicate with other sub-systems, and identify logical groups of two or more sub-systems. For at least some embodiments, identifying logical groups comprises at least the controller and at least one of the other sub-systems auto-determining the logical group. For an embodiment, at least one of the logical groups includes a motion sensing group. For an embodiment, at least one of the logical groups includes an ambient light group. For an embodiment, at least one of the logical groups includes a logical switch group. For an embodiment, at least one of the logical groups includes a logical temperature group.

For an embodiment, the controller is operative to control the light output based on a sensor signal of a sensor of another sub-system of a common logical group. For an embodiment, sub-systems of a common logical group communicate to each other when a sensor of one of the sub-systems of the logical group has failed.

Figure 2:
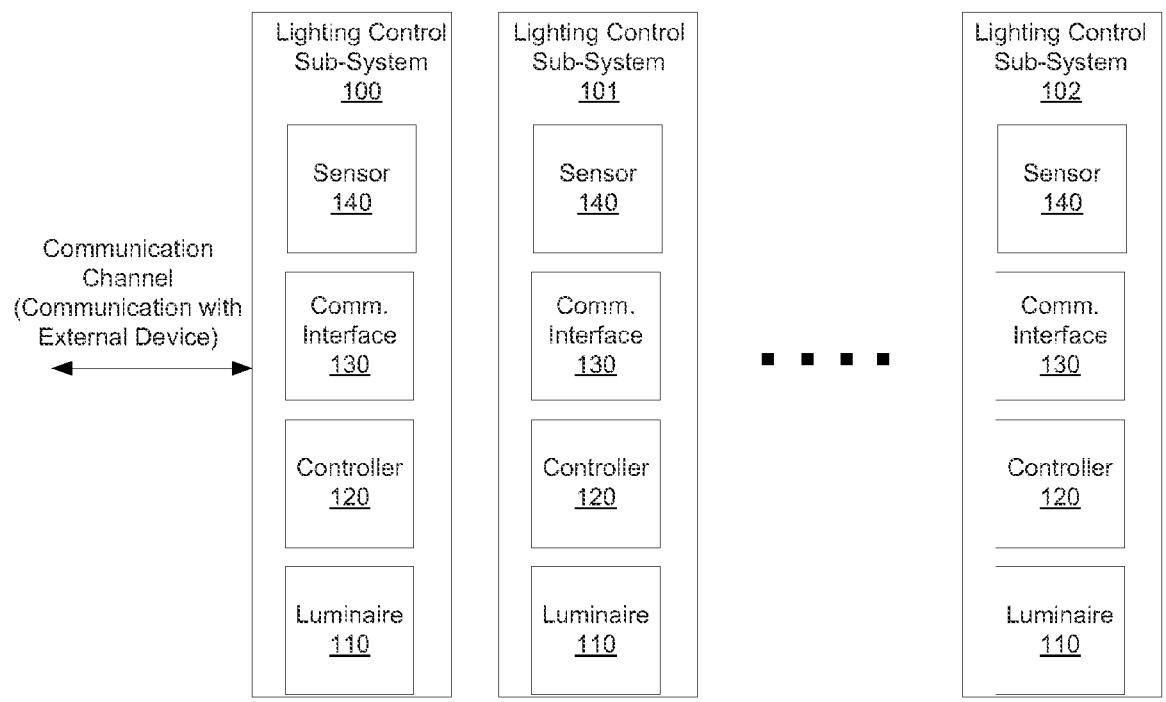
FIG. 2 shows a distributed lighting control system that includes sub-systems, according to an embodiment.

For an embodiment, the controller is operative to identify an emergency condition, and initiate an emergency mode. For a specific embodiment, the controller is operative to confirm the identification of the emergency mode, including the controller initiating communication with a non-emergency device, and confirming the identified emergency condition if the initiated communication is not successful, FIG. 2 shows a distributed lighting control system that includes a plurality of sub-systems 100, 101, 102, according to an embodiment. As shown, each (or at least some of the sub-systems 100, 101, 102 include the previously described luminaire 110, controller 120, communication interface 130, and sensor 140.

Figure 3:
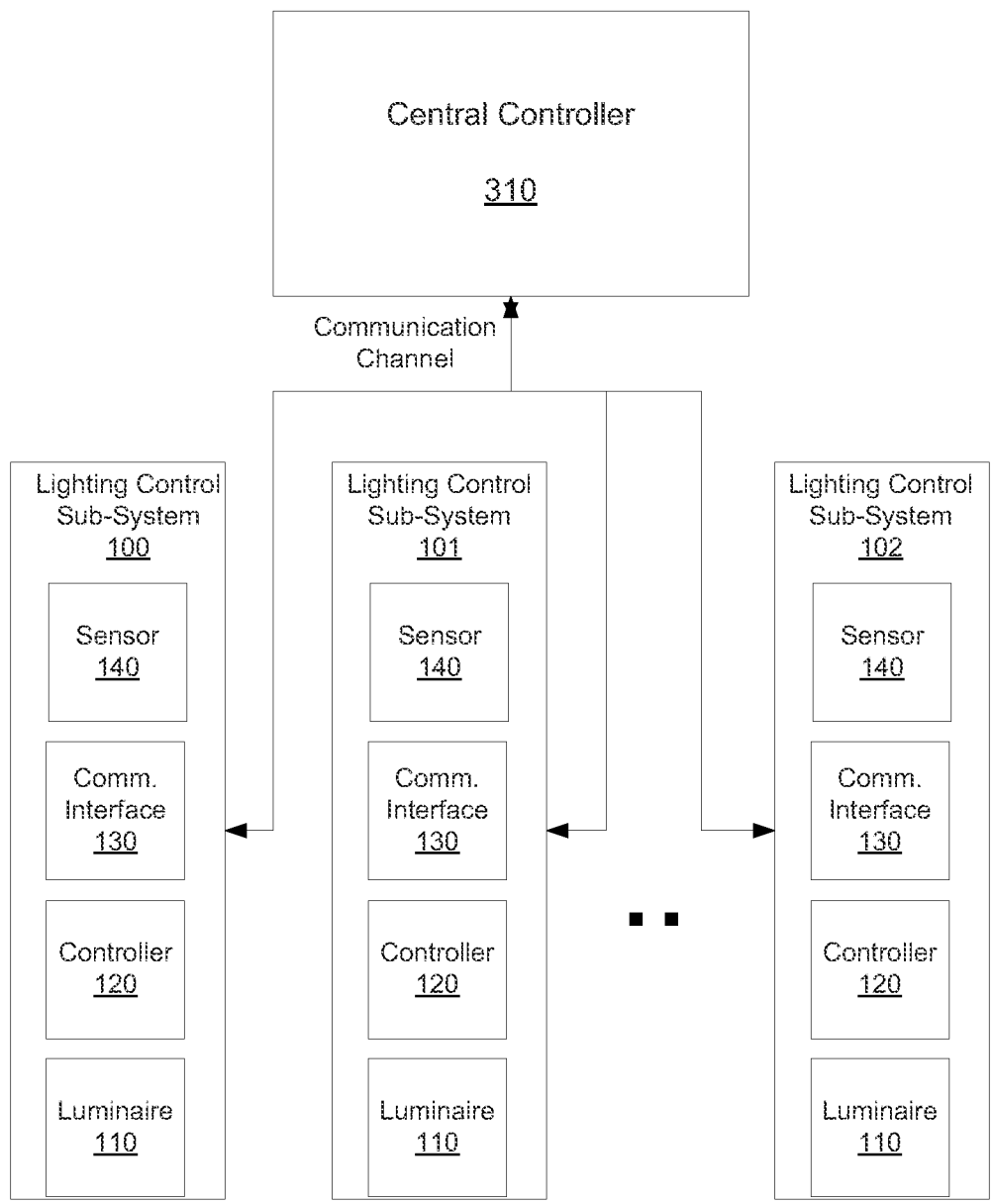
FIG. 3 shows a distributed lighting control system that includes sub-systems and a central controller, according to an embodiment.

FIG. 3 shows a distributed lighting control system that includes plurality of sub-systems 100, 101, 102 and a central controller 310, according to an embodiment. For at least some embodiments, each sub-system is capable of independent action. Each sub-system 100, 101, 102 is further capable of acting responsive to the central controller 310. Further each, sub-system 100, 101, 102 includes a luminaire 110, a controller 120 coupled to the luminaire, at least one sensor 140 coupled to the controller, and a communication interface 130. The at least one sensor 140 generates a sensed input, and the communication interface 130 couples the controller 120 to at least one of the central controller 310 or another sub-system. For at least some embodiments, the controller is operative to control a light output of the luminaire 110, and communicate at least one of state or sensed information to at least one of the central controller 310 or another sub-system.

For an embodiment, central controller 310 configures all sub-systems 100, 101, 102 (so that they can operate autonomously), gathers and stores periodic reports of status and statistics from all sub-systems 100, 101, 102, gathers asynchronous event reports from sub-systems 100, 101, 102, replaces the software running in any sub-system 100, 101, 102, and on operator command, can control the light level on any sub-system 100, 101, 102. Further, for an embodiment, on operator command, the central controller 310 can return a sub-system to run in autonomous mode on operator command. An embodiment of the central controller 310 also provides a management user interface to the lighting control system 100, 101, 102 so that operators of the system 100, 101, 102 can perform management operations including viewing the status, upgrading the software running on the sub-systems 100, 101, 102, changing the configuration of the sub-systems, upgrade software on selected sub-systems, upgrading software on the central controller 310, backing up configurations and saving status and statistics, etc. An embodiment of the central controller 310 sets configurations and gathers periodic reports of status from all the sub-systems 100, 101, 102.

For an embodiment, the central controller 310 includes an Ethernet interface that it uses to connect to one or more gateways via an IP network. For an embodiment, the gateways use a wireless communication interface to connect to one or more sub-systems 100, 101, 102. At least some embodiments of the lighting control system are designed so that the lighting control system is agnostic to the networking type or topology that is used to provide communications between the central controller and sub-systems. For an embodiment, the central controller 310 uses the HTTPS protocol, which is used to support secure connection with a Web browser that runs on a computer and provides a graphical user interface. For an embodiment, the central controller is powered by a 100 to 240V power supply. Embodiments of the central controller can be located anywhere there is power, an Ethernet connection, and an environment that doesn't exceed the environmental constraints of the hardware.

At least some embodiments include an apparatus and/or method for retrofitting a lighting control sub-system. The retrofit kit allows for upgrading of presently existing minimal intelligent lighting control sub-systems without having to modify existing power line and power control wiring. The retrofitted lighting control sub-system allows for intelligent control of the light of the lighting control sub-system. The retrofitted lighting control sub-system can be networked with other retrofitted lighting control sub-systems allowing for distributed control of multiple lighting control sub-systems. Additionally, embodiments of the retrofitted light include network interfaces for additional or alternative light control.

For an embodiment, a retrofit controller is interfaced with a dimming ballast of an existing light, which includes breaking an existing power supply and dimming control connections of the dimming ballast, inserting the retrofit controller, and connecting the power supply and dimming connections of the dimming ballast to the retrofit controller. Additionally, the retrofit controller is connected to at least one sensor by attaching an external electrically conductive line between at least one external sensor and the retrofit controller. Existing external electrical wiring and switches can be left alone and not modified.

For an embodiment, the at least one external sensor is affixed proximate to the light fixture. For example, if the light fixture is attached to the ceiling of a room, the at least external sensor is affixed to the ceiling proximate to the light fixture.

An external electrically conductive line is connected between the retrofit controller and the at least one external sensor. For an embodiment, the external electrically conductive line provides power to the at least one external sensor from the retrofit controller. For an embodiment, the external electrically conductive line provides control information from the at least one external sensor to the retrofit controller.

The at least one external sensor can merely provide sensed signals, or the at least one external sensor can include a controller, and the at least one external sensor is wirelessly connected to a network. Additionally, embodiments include the at least one external sensor providing dimming control information to the retrofit controller based on at least one of sensed information and control information received from the network.

For another embodiment, the retrofit controller receives sensed information from the at least one sensor, and adaptively controls the dimming ballast based on the sensed information. The sensed information can include, for example, sensed light, sensed motion, or sensed temperature, in which intelligent lighting control decisions can be made.

If many of retrofitted intelligent light controllers are operating in conjunction, the light controllers can all be interfaced with a central controller. For this embodiment, the retrofit controller can receive control information through the network to manage, reduce or control power consumption of the light controller. Alternatively, the light controllers can include decentralized control, and each retrofit controller can receive control information from other retrofit controllers over the network.

For an embodiment, the central controller is operative to provide a system management of the lighting control system. For at least some embodiments, the system management provides a user interface, allowing a user to configure operation of one or more of the plurality of sub-systems.

For at least some embodiments, the central controller is further operative to receive sensed values and sub-system state information for one or more of the plurality of sub-systems. For at least some embodiments, the central controller is further operative to aggregate and display the received sensed values of the one or more of the plurality of sub-systems. For at least some embodiments, the central controller is further operative display summary statistics of the received sensed values over variable periods of time. The display summary statistics can include roll-ups that includes display statistics (averages over periods of time, such as, minutes, hours, days, week, months and/or years.

For at least some embodiments, the central controller is operative to identify a failure of emergency sub-systems, and to identify and communicate to other sub-systems operation to operate in an emergency mode. For at least some embodiments, the central controller operative to receive a demand response from an external power company, and adaptively communicate to the plurality of sub-systems to operate in a reduced power mode.

Figure 4:
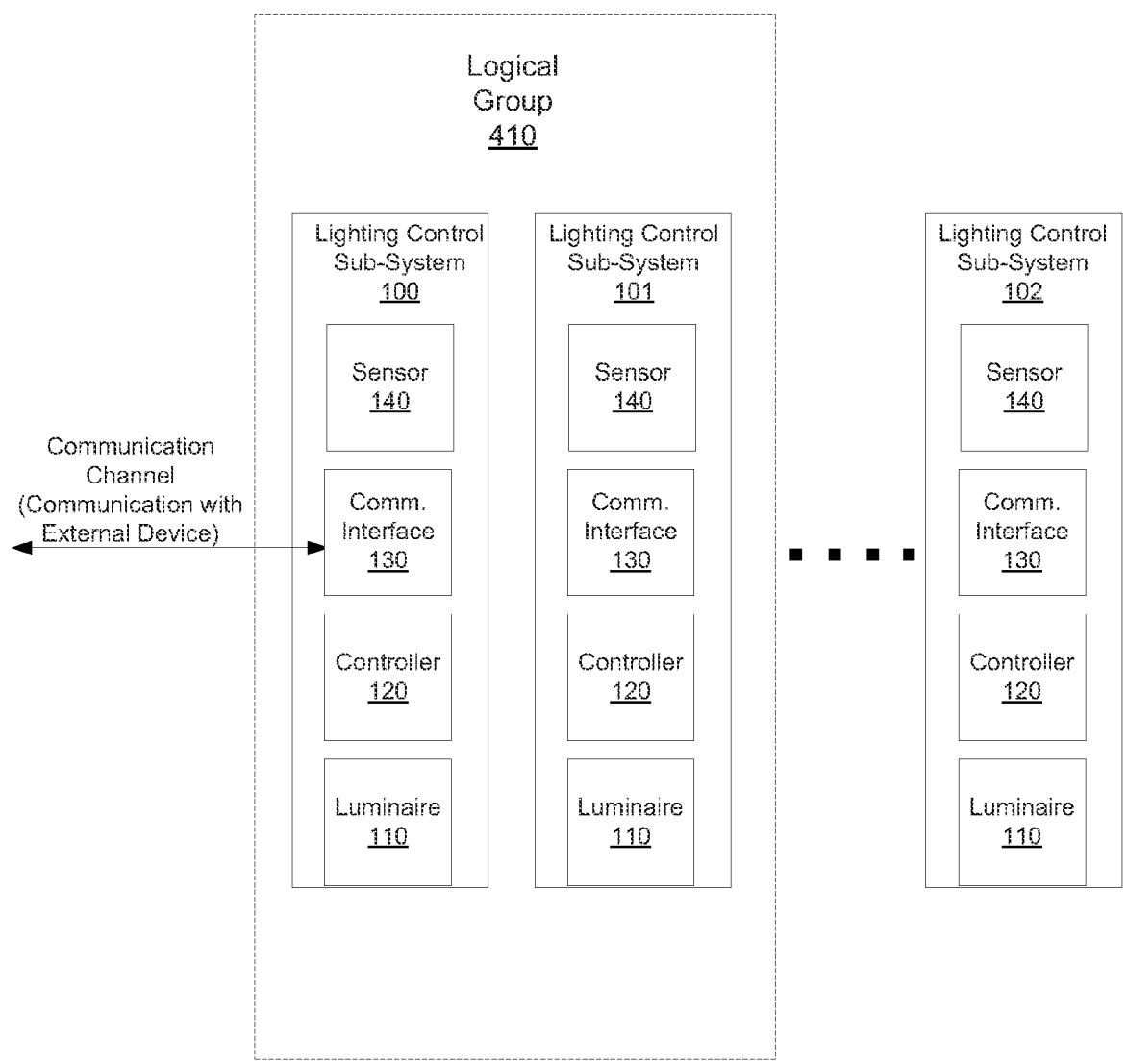
FIG. 4 shows a distributed lighting control system that includes a logical group of sub-systems, according to an embodiment.

FIG. 4 shows a distributed lighting control system that includes a logical group 410 of sub-systems, according to an embodiment. That is, for example, the logical group 410 includes lighting control sub-systems 100, 101. Once a logical group has been defined, state and sense information of lighting control sub-systems of the logical groups can be share among the member lighting control sub-systems of the group, thereby providing each member with additional intelligence. Additionally, member lighting control sub-systems of the logical group can be commonly controlled.

Based on the ability of the lighting control sub-systems to communicate with each other, an embodiment includes the sub-systems of a logical group providing each other with their sensor readings and providing each other with their decisions for setting light levels. Therefore, the lighting control sub-systems can coordinate their control of lights. For example, a group of the lighting control sub-systems can be set up that consists of all fixtures (sub-systems) in a conference room. Therefore, when any of the sub-systems senses motion (due to an occupant entering through any of the doors to the conference room) and the lights are off, the sub-system communicates the turning on the lights due to motion with the other members in the group so that all of them turn on their light. Also, while motion is detected by any sub-subsystem, this can be communicated with the members of the group so that the lights are kept on, even by the sub-systems that have not recently detected motion. Another example is lights in a corridor being in a group. When they are, they can communicate their detection of motion and physical location to the other lights in the group, so they can react in such a way that only the nearby lights "in front of" a moving person in a deserted corridor turn on (or brighten up if they are on at a low level). Yet another example is an external device that acts like a sophisticated light switch. When a user selects a lighting scene on it, it sends the scene to all sub-systems that are members of a "switch group".

For an embodiment, the controller of each lighting sub-system is operative to communicate with other sub-systems, and identify logical groups of two or more sub-systems. For an embodiment, the controller is operative to control the light output based on a sensor signal of a sensor of another sub-system. For an embodiment, identifying logical groups includes at least the controller and at least one of the other sub-systems auto-determining the logical group.

Embodiments include various types of logical groups. Exemplary logic groups include a motion sensing group, an ambient light group, a logical switch group, and/or a logical temperature group. It is to be understood that this is not an exhaustive list.

For at least some embodiments of a building control system that include the distributed lighting control system includes a logical group 410 of sub-systems, the sub-systems are independently operable. That is, each of the sub-systems can operate completely independently, and the controller within each sub-system is operable without receiving any commands from a central controller. For other embodiments, the sub-systems operate in conjunction with other sub-systems, such as, other sub-systems within a common logical group. For this embodiment, decisions regarding building control can involve a collaborative interaction between multiple sub-systems. For other embodiments, one or more sub-systems are interfaced with a system controller.

For an embodiment, each controller 120, of each lighting control sub-system 100, 101, 102 independently control an environmental load or a security device. More specifically, the controller controls at least one of a lighting intensity, an environmental control, or a building security control. As will be described, the building control sub-systems can include lighting (that is, a light in included with the sub-system), and the controller of the sub-system controls the intensity of light emitted from the light. Alternatively or additionally, the sub-system can include environment control, such as, temperature or humidity. For this embodiment, the sub-system can be interface or be a part of an HVAC system. Alternatively or additionally, the sub-system can interface with or be a part of a building security system.

For at least some embodiments, the controller of each sub-system is operative to independently control the environmental load and/or the security device based on at least one of shared sensor or shared state information received from at least one other of the plurality of sub-systems within the logical group. For embodiments, the environmental control includes light, temperature and/or humidity. For embodiments, the shared sensor information includes sense light, motion, temperature, humidity, and other possible sensors.

For embodiments, the state information includes, for example, occupancy information, clear state timer, light subsystem emitted light intensity.

A sub-system may control, for example, an intensity of light emitted from the sub-system based at least in part on a sensed parameter from another sub-system of the logical group. A sub-system may control heat or humidity based on temperature or humidity sensing of other sub-systems within the logical group. A sub-system may make security decisions based on parameters sensed by other sub-systems of the logical group.

A factor that greatly adds to the intelligence of the distributed building control sub-systems is the designations of logical groups, wherein sub-systems of a logical group control building parameters based on sensed input from other building control sub-systems of the logical group.

For an embodiment, the controller within a building control sub-system is operative to help designate one or more of the plurality of sub-systems as belonging to the logical group. That is, the sub-systems operate in conjunction with other sub-systems, such as, other sub-systems within a common logical group. For this embodiment, decisions regarding building control can involve a collaborative interaction between multiple sub-systems. For another embodiment, at least a sub-plurality of the plurality of sub-systems auto-determine which sub-systems are included within the logical group.

For an embodiment, sub-systems auto-designate logical groups based on location and/or proximity. That is, for one example, each sub-system knows their location (for example, x, y and z coordinates) and auto-designates based on a sensed input, and proximity, or a location (for example, x, y and z coordinates) of the sensor that generated the sensed input. Sub-systems which are classified into certain categories e.g. corridor, emergency) affiliate themselves with other sub-systems based on commonality of category and proximity. For example, a sub-system in a corridor or emergency path will receive motion sensing input from another sub-system in the corridor or emergency path and, based on the fact that they are both in the same category and that they are within a distance threshold (proximity) determines that it is in the same motion group as the sub-system from which input (sensed) was received.

Stated another way, for an embodiment, auto-determining includes at least one of the sub-systems receiving a sensed input of a different sub-system, and the at least one sub-system auto-designating itself into a logical group that includes the different sub-system based on a proximity of the at least one sub-system to the different sub-system. For a specific embodiment, the at least one sub-system determines its proximity to the different sub-system based on a three-dimensional x, y, z location of the at least one sub-system relative to a three-dimensional x, y, z location of the different sub-system.

While described in the context of auto-designating groups, it is to be understood that location or proximity information can be used by sub-systems to influence operation. That is, for example, a sub-system may base its operation based on logical groupings, and additionally, based on the proximity of a sensed input.

For an embodiment, an administrator specifies which of the plurality of sub-systems belong to the logical group. Generally, the administrator specification occurs at installation, and may remain static. For another embodiment, a manual operator specifies which of the plurality of sub-systems belong to the logical group. This can include the operator having a manual control (such as a switch or a set of switches) that allows the manual operator to set and control logical groupings.

An embodiment includes each of the sub-systems of the logical group additionally being operative to receive an input from a device, wherein the sub-system responds to the input if the input includes an identifier associating the input with the logical group. For this embodiment an external controller can interface with particular logical groups based on the unique identifier associated with the logical group. Associating the unique identifiers with logical groups provides for ease of scaling of the number of sub-systems. That is, for example, conventional centrally-controlled systems require either more messages or larger messages to control sub-systems, whereas including unique identifiers with logical groups provides for an efficient system in which the transmitted data doesn't grow or increase as the group grows. Additionally, the system is less reliant on and requires less use of any one communication channel, and therefore, the likelihood of failure due to communication channel use is less.

An embodiment includes sub-systems within the logical group restarting a clear-state-timer upon sensing of motion and/or light by a sub-system within the logical group. The clear-state time can be defined by an occupancy window that estimates, for example, how long a space will be occupied after sensing an occupant. That is, for example, lights can be turned on within a building or structure for a period of the clear-state-timer, which can be estimated by an occupancy window. This embodiment allows members (sub-systems) of a logical group to transition states while maintaining synchronization with each other.

An exemplary method or sequence of events of a clear-state-timer operation includes sub-system in motion group detecting motion. For operation of an exemplary set of lighting sub-systems, all sub-systems in motion group brighten and set an occupancy window of some configured time. At the expiration of the occupancy window, the sub-systems should dim/turn off. However, if during the occupancy window, some sub-systems in the motion group subsequently detects motion, all sub-systems in the motion group reset the occupancy window since the area covered by the motion group is still occupied. After the occupancy window expires, all sub-systems dim or turn off.

For an embodiment, sensing of motion and/or light by sub-systems within the logical group within a predetermined amount of time after restarting a lighting on-time is ignored. That is, for example, sensing of light and/or motion is ignored just after lighting of the lighting sub-systems. The period of time in which sensed inputs are ignored can be defined a dead-time. The dead time can reduce "chatter" between lights of a logical group. That is, multiple lights within a logical group can near-simultaneously sense a change in motion and/or light which can cause redundant or excess chatter among the lighting sub-systems of the logical group.

An embodiment includes a sub-system ignores its own sensing of light and/or motion for a predetermined period of time if the sub-system receives an indication of sensing of light and/or motion from another sub-system of the logical group. This process can be defined as "anti-sensing". Anti-sensing can be useful, for example, for preventing a light sub-system of an office or a conference room from turning on when someone passes by outside the office or conference room.

Various embodiments include different types of logical groups. Exemplary logical group types include, for example, a motion sensing group (previously mentioned), an ambient light group, a logical temperature group, and a logical switch group. Clearly, additional types of logical groups can additionally or alternatively exist. Additionally, a sub-system can belong to any number of different logical groups. Logically grouping of sub-systems is useful for synchronizing members of logical groups, normalizing behavior based on larger samples of data, and/or making better decision based on larger sample of data Additionally, a sub-system being able to belong to any number of different groups is difficult and expensive in centrally controlled systems. As the membership list of sub-systems in a centrally controlled system grows, the data that the controller must manage grows, which causes scaling problems.

An exemplary motion sensing group can be utilized, for example, by lighting sub-systems located in a corridor. For an embodiment, sub-systems of a corridor determining they are in a corridor, and auto-designate themselves to be included within a common logical group (that is, the motion sensing group). Further, the motion sensing group includes a corridor look-ahead behavior, wherein for the look-ahead behavior, a plurality of overlapping logical groups of sub-systems provide propagation of light along a corridor. It is to be understood that there are various embodiments for implementing this motion group. The members of the group can be defined as desired to ensure user-friendly behavior of lighting produced by the member of the motion sensing group.

This propagation of light can be used in applications where objects are moving at a high speed (that is, speed greater than a predetermined threshold) and the path of the object's motion needs to be illuminated. Additionally, the corridor took-ahead behavior provides for a safer environment in sparsely populated hallways during the night since individuals moving through the corridor can see farther ahead. By using the corridor took-ahead behavior, the motion sensing group can achieve an effective mix of safety and energy efficiency because the appropriate level of light is provided without having to illuminate the entire corridor (as is the case with many traditional lighting control systems).

For the ambient light group, an embodiment includes at least a subset of the plurality sub-systems auto-designating themselves to be within the ambient light group. The auto or self-designation of the light can be made, for example, by the at least a subset of the plurality of light determining that they receive a change of light near-simultaneously (that is, for example, within a defined time slot).

For an embodiment, if at least one of the sub-systems of the logical group sense a motion and/or light sensing blindness condition, then the at least one sub-system retrieving sensing information from other sub-systems within a common logical group to determine motion and/or ambient light level, and the sub-system responds accordingly. That is, a sub-system (such as a lighting sub-system) solicits information from others in logical group if the lighting sub-system is blind. It is to be understood that the same concept can be extended to other sensor as well, such as, motion sensors or temperature sensors.

For a logical switching group, an embodiment includes the logical group being designated by a group id, and sub-systems that are members of the logical group having the group id are controlled by a logical switch or a physical switch. For an embodiment, the member sub-systems are controlled to provide predetermined scenes.

For example, a conference room might have predetermined scenes which dim the sub-systems near a projector screen or group viewing monitor. Other scenes can include optimizing light levels for specific tasks (for example, task tuning).

An embodiment includes at least one sub-system of the logical group receiving a reference or baseline value for at least one of motion and/or light sensor input from another sub-system in the logical group. For example, a lighting sub-system solicits the ambient light level from another lighting sub-system in the logical group to establish a reference for the minimum light level in a particular building location. Further, the lighting sub-system may receive the input from the other sub-system(s) in the group, and then compare its own measured (sensed) values against the received values to make a decision. For example, the received values could be a target (such as a heating or cooling target, and further the sub-system adjusting its temperature until it reaches the target). For another embodiment, the sub-system uses the received value to determine some external factor. For example, the value received from a sub-system located outside can be used to determine outside temperature which can be used to aid in adjustment of an inside temperature. Clearly, these embodiments can be extended beyond just temperature control.

For the logical temperature group, an embodiment includes a sub-system receiving at least one of an occupancy (motion) input and a temperature sensor input from at least one of the other sub-systems in the logical group to control an environmental load. For other embodiments, this can further include the sub-system controlling the environmental load by averaging the temperatures of all the sub-systems in the logical group. Additionally, or alternatively, embodiments include the sub-system controlling the environmental load, for example, using only the temperatures of sub-systems in the logical group which are reporting occupancy. For embodiments, the environment is controlled only in places that matter, such as, occupied spaces. The described embodiments allow from determination of whether a space is really occupied, are whether one is merely passing through the spaces.

Figure 5:
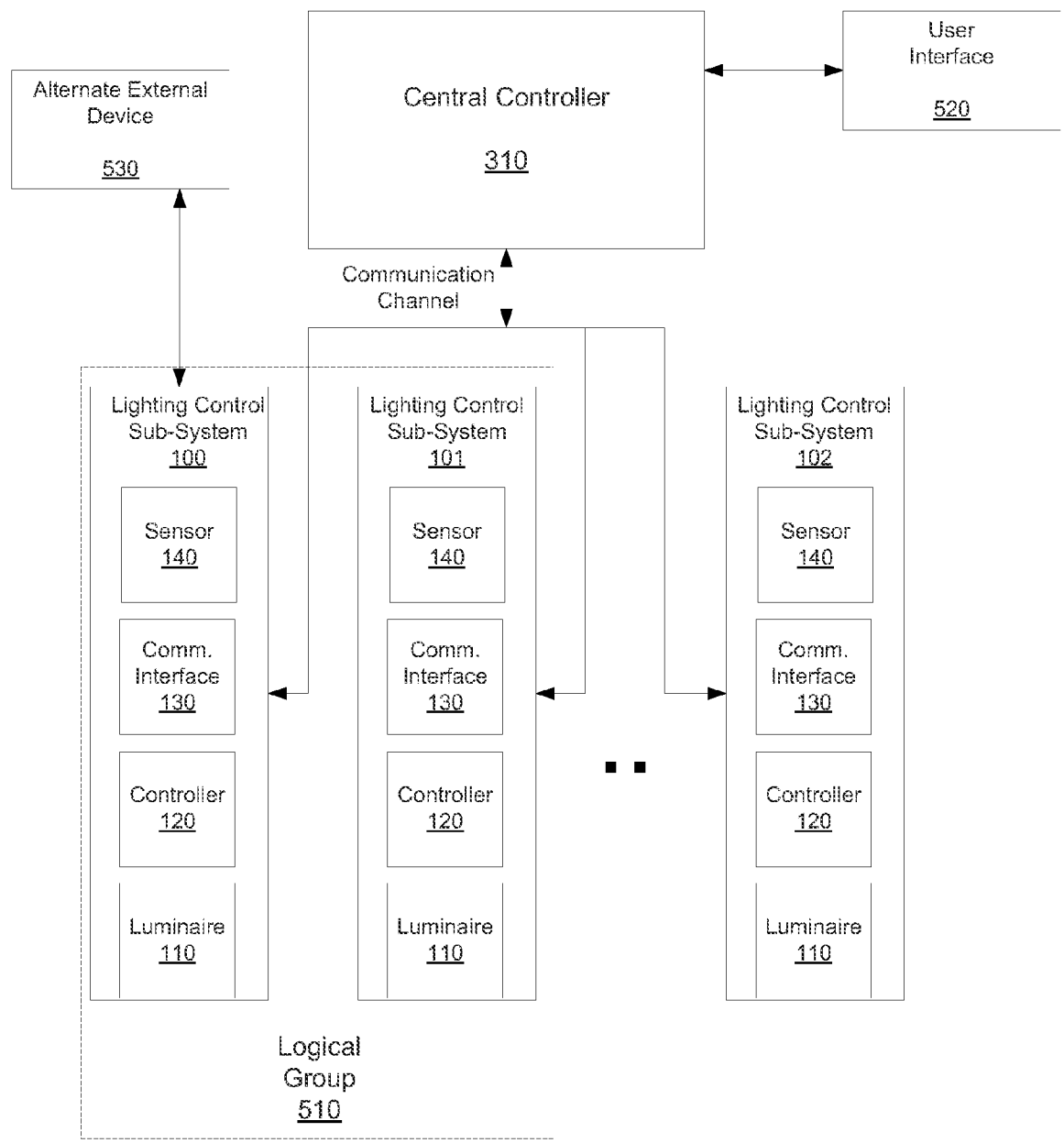
FIG. 5 shows a distributed lighting control system that includes that includes a logical group of sub-systems and a central controller, according to an embodiment.

FIG. 5 shows a distributed lighting control system that includes that includes a logical group 510 of sub-systems and a central controller 310, according to an embodiment. For an embodiment, the central controller 310 provides information to and controls each of the sub-systems based at least in part on the logical group of the lighting subsystem.

For at least some embodiments, the central controller 310 is interfaced with a user interface (UI) 520 that allows a user to control, or receive information from the central controller.

For at least some embodiments, the logical groups (such as logical group 510) receive instructions, or provide information to an external device 530. As previously described, the external device can be other lighting control system or the central controller, but for at least some embodiments, the external controller 530 can be a switch (that is, a lighting control device that looks like, for example, a lighting wall switch), an array of sensor, or a user controlled handheld device (such as, a tablet computer or a smart phone). Clearly, the external device 530 can be devices other than listed.

For example, if the external device is a switch, the switch can provide operation instructions to the logical group 510. The instructions can be provided using a unique identifier, and the logical group that responds to the unique identifier can respond accordingly.

If the external device 530 includes an array of sensors, information obtained by any one of the lighting control sub-systems, or logical groups of lighting control sub-systems can be used to learn more about the structure the lighting control sub-systems are located in.

If the external device 530 is a handheld device, the handheld device can be used by a system operator to travel around a structure that includes one or more of the lighting control sub-systems, and trouble shoot and/or learn about the operation of the lighting control sub-systems of the structure. For an embodiment, one or more of the lighting control sub-systems include memory. Sensed and/or state information of one or more of the lighting control sub-systems, or sensed and/or state information of one or more of the logical groups is stored within the memory. A system operator can periodically stop by, access the memory, and obtain the sensed and/or state information.

Figure 6:
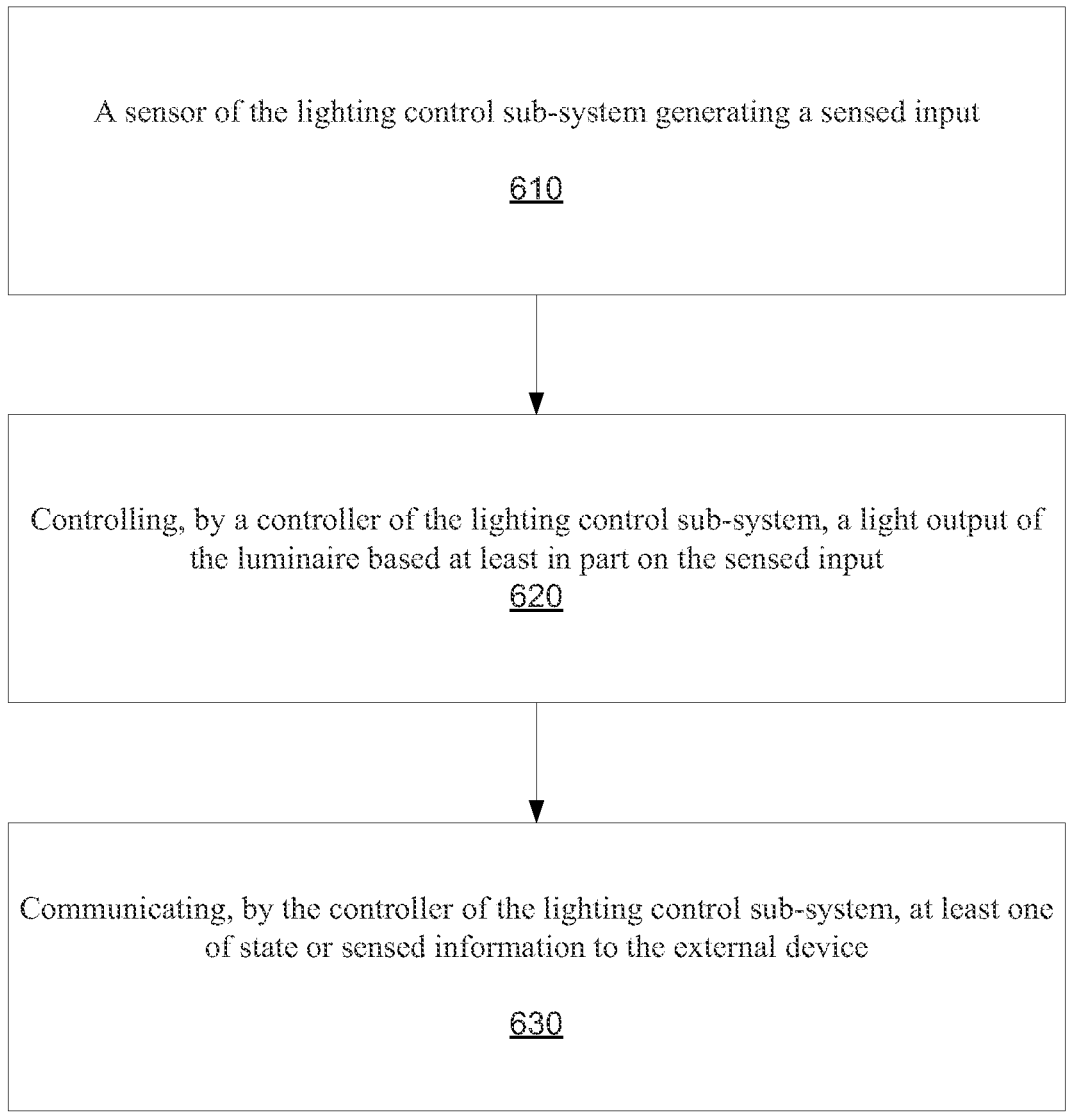
FIG. 6 is a flow chart that includes steps of a method of operating a lighting control sub-system, according to an embodiment.

FIG. 6 is a flow chart that includes steps of a method of operating a lighting control sub-system, according to an embodiment. A first step 610 includes a sensor of the lighting control sub-system generating a sensed input. A second step 620 includes controlling, by a controller of the lighting control sub-system, a light output of the luminaire based at least in part on the sensed input. A third step 630 includes communicating, by the controller of the lighting control sub-system, at least one of state or sensed information to the external device.

Figure 7:
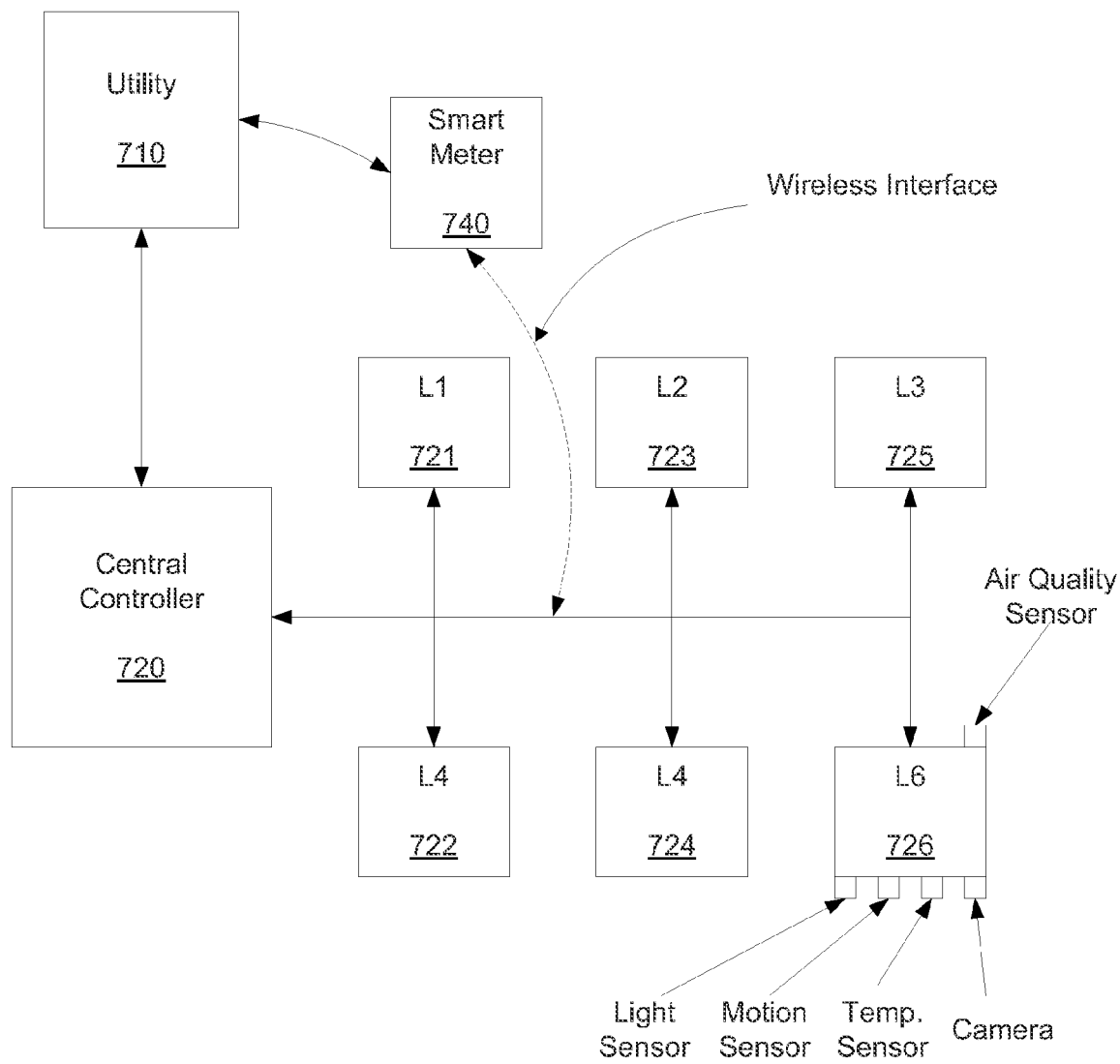
FIG. 7 shows another example of lighting control sub-systems (independently controlled lights) interfaced with a central controller.

FIG. 7 shows an example of a plurality of independently controlled lights (embodiments of the previously described lighting control sub-systems) 721, 722, 723, 724, 725, 726 interfaced with a central controller 720 (for an embodiment, the central controller includes a light and energy management system). As shown, data can be exchanged between the central controller 720 and each of the independently controlled lights 721, 722, 723, 724, 725, 726. The information from the central controller 720 typically includes a light profile. Additionally, information can be conveyed from the central controller 720 to the independently controlled lights in, for example, an emergency situation.

As shown, the independently controlled lights can include any number of sensors. The sensors can include, for example, a light sensor, a motion sensor, a temperature sensor, a camera, and/or an air quality sensor. Information obtained from the sensors can be used directly by the independently controlled light itself, or at least some of the information can be fed back to the central controller 720. The central controller 720 can interface with, for example, a utility server 710 which can provide utility information, such as, real-time energy costs, and demand response. For an alternate embodiment, one or more of the independently controlled lights can communicate directly with the utility server 710 through, for example, a Zigbee© interface and a smart meter 740

Figure 8:
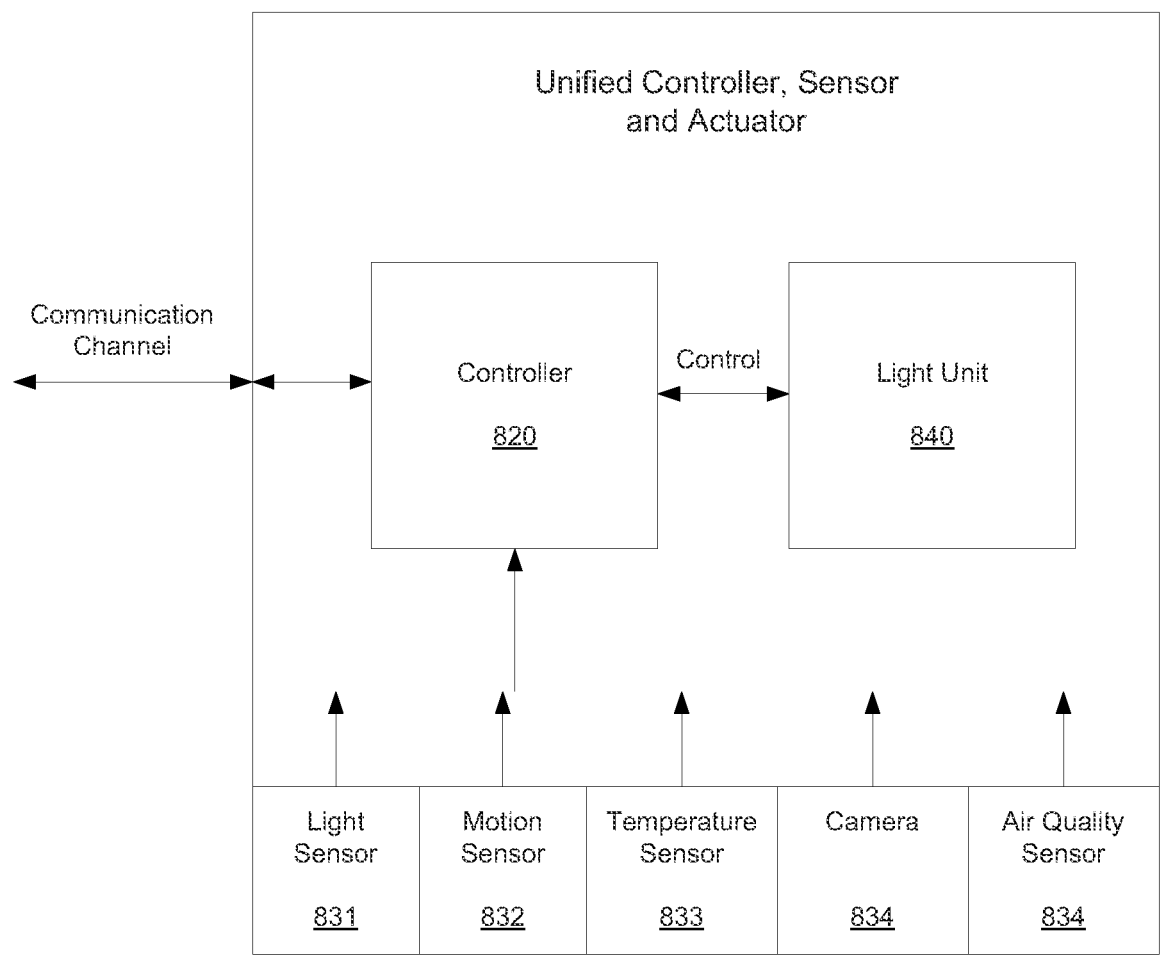
FIG. 8 shows an embodiment of an independently controllable light

The central controller shown as FIG. 7 is optional. That is, it is to be understood that the independently controllable light are capable of operating without the central controller FIG. 8 shows an embodiment of an independently controllable light (unified controller, actuator and sensors, which according to at least one embodiment includes the previously described lighting control sub-system). The independently controllable light includes a controller 820 that independently manages and controls the operation of a lighting unit (luminaire) 840. As previously described, the independently controllable light can include any combination of sensors, such as, a light sensor 831, a motion sensor 832, a temperature sensor 833, a camera 834, and/or an air quality sensor 834. Also, as described, the independently controllable light can receive profiles from elsewhere over a communications channel.

In FIG. 8 the independently controllable light includes the light unit (luminaire). It is to be understood that the light unit could alternatively be external to the controller. For this embodiment, the controller can include outputs to effect the light level changes. For example, the outputs can control relays to turn lights on and off, and control 0-10 V or PWM (pulse width modulation) outputs for dimming. The controller 820 can include a standard chipset that integrates a microprocessor unit, and interface for communicating different program instructions, and several ports for communicating with electronic devices.

Upon being powered up, a power on mode can be initiated in which a default profile is used. Next, a discovery mode can be initiated in which the independently controllable light associates with the central controller, or other neighboring lights. It should be noted, that due to independent control, installation of the lights can be done one light at a time without interfacing with a central controller. However, if association with a central controller is established, the independently controllable light can start periodically communicating data with the central controller. The central controller can then upload a different profile than the default profile.

In one example, when motion has not been detected for a specific interval of time, light produced by the light unit 840 is dimmed gradually or allowed to remain off. When motion is detected, software executed on the microcontroller 820 compares a sensed level of light with a target level of light. When the difference between the sensed level and the target level is substantial, the intensity of produced light can be adaptively changed depending upon a variety of factors including whether the measured light is higher or lower than the target level and the extent of the discrepancy between these levels. Additionally, other factors can be considered such as, sensor measurements of the recent past, the time of day, and/or other observed patterns. Additionally, the previously described light profile can influence the emitted light adjustments.

An embodiment includes adjusting the light by adjusting a wavelength of light emitted from the light. Embodiments include sensing the color temperature of the ambient light with a light sensor and simulating natural day light cycle.

Predetermined actions can be taken upon detected failure of sensors of the light. For example, the light level of the light can increase if a failure of the light sensor is detected. Occupancy can be assumed upon detection of a failure of the occupancy sensor.

Various methods can be used to adjust the light level of the light. For example, if the light is within a sub-system, the light can be adjusted by powering off or powering on one or more lights in the sub-system (such as a fluorescent light sub-system with several bulbs). An alternate embodiment includes the target light intensity being established by a coordinated configuration sequence across many lights in an area. For an embodiment, according to the light profile the target light intensity is established at least in part by a coordinated configuration sequence across many lights in an area. A specific embodiment includes a pair of fluorescent light sub-systems with three bulbs each, in which two of the six bulbs are controlled by one dimmable ballast, and four of the six bulbs are controlled by a separate dimmable ballast. The two-bulb ballast controls one bulb in each sub-system, and the four-bulb ballast controls two bulbs in each sub-system. Dimming is achieved by the dimmable ballasts by turning off two or four of the light bulbs while the rest remain on.

Particular configurations of lights include light ballasts that are inefficient below a certain percentage of brightness. To accommodate these light ballasts adjusting the light intensity below this percentage brightness includes dimming until off one or more lights gradually simultaneously with brightening the remaining lights to achieve the desired light level adjustment.

Figure 9:
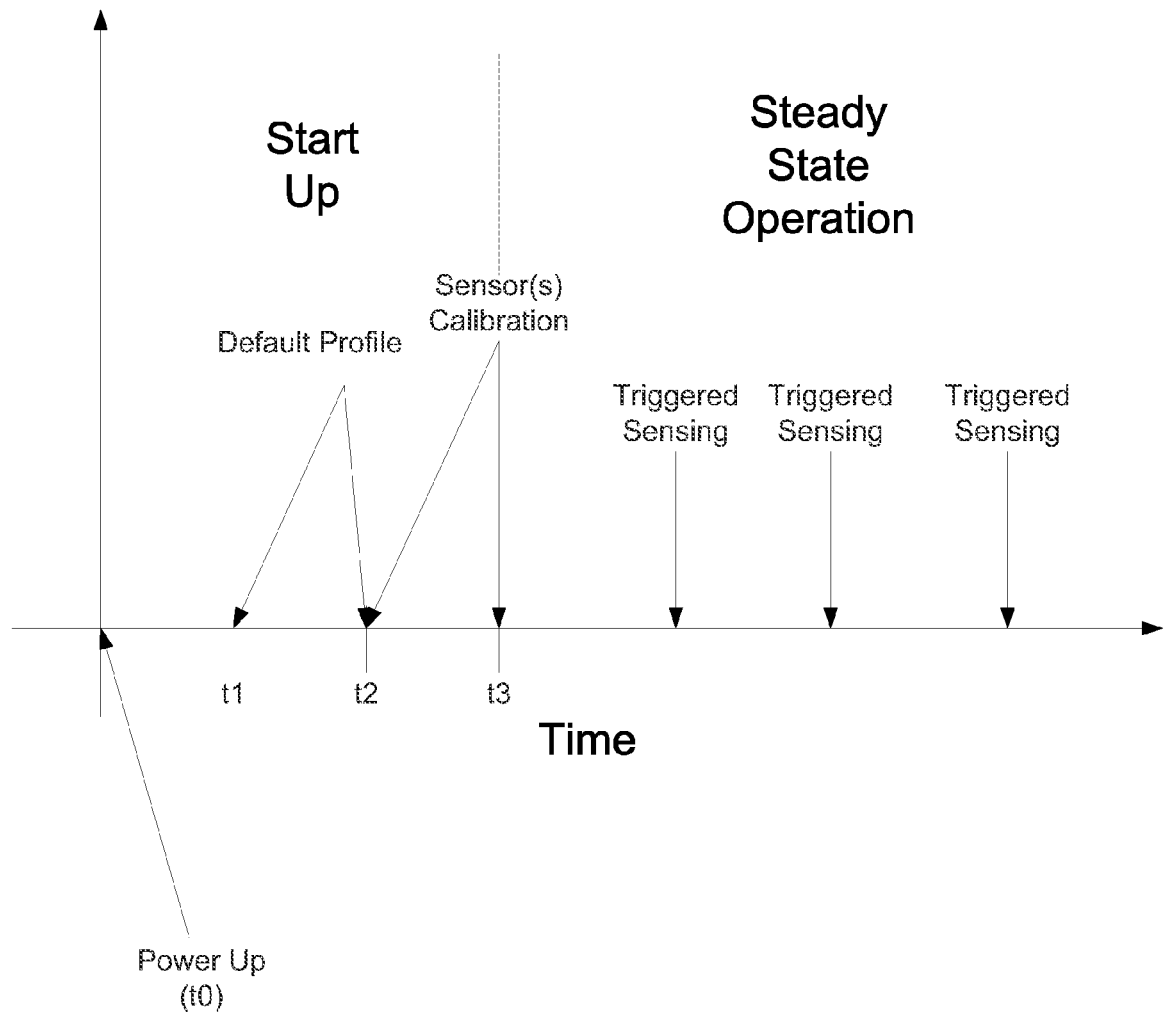
Figure 10:
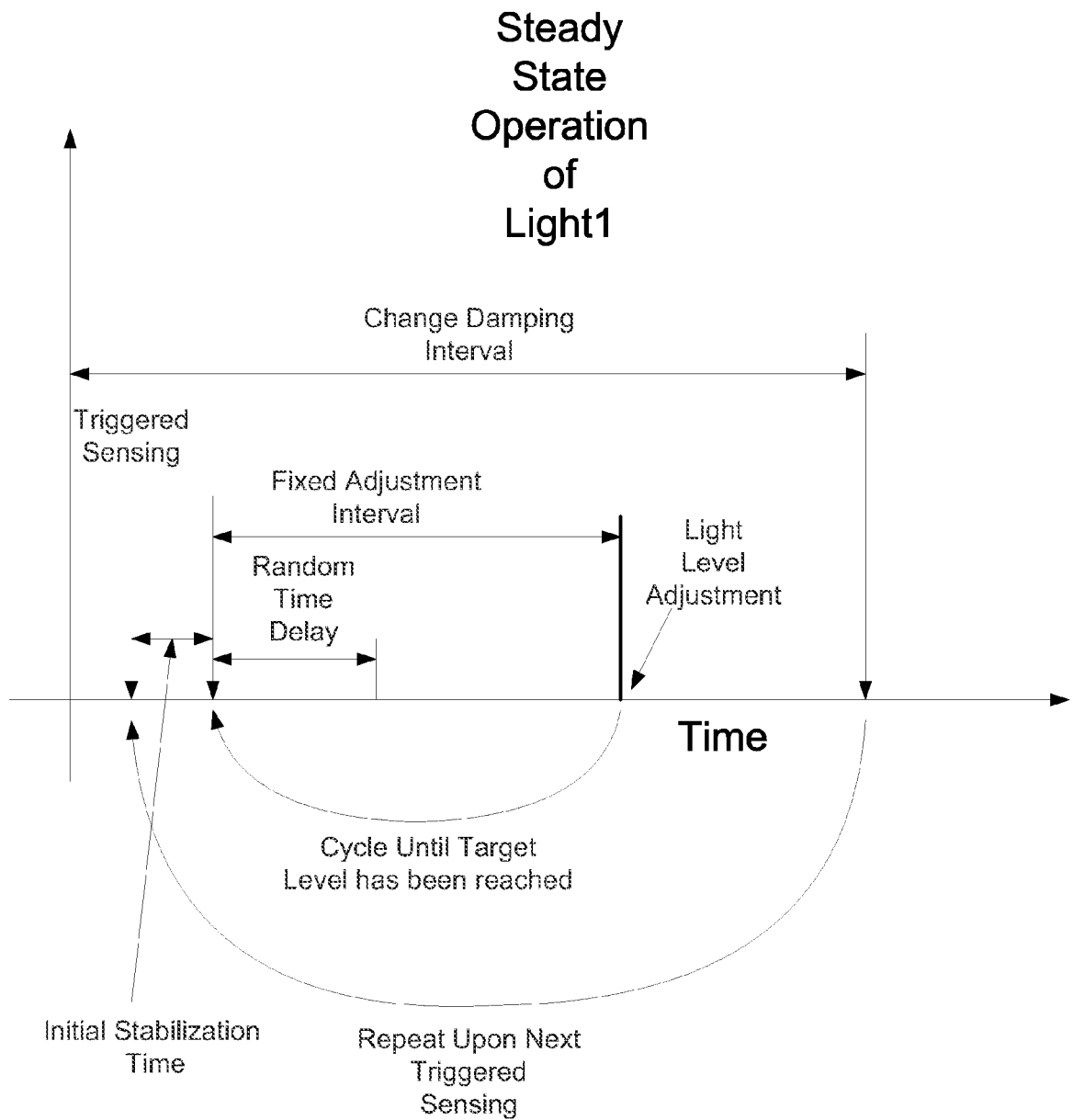
FIG. 10 is a time-line that shows an example of a sequence of timing events while an independently controllable light is operating.

FIG. 9 is a time-line that shows an example of a sequence of timing events as an independently controllable light is powered on. As shown, at t0, the independently controllable light is powered on. At a later time t1, the independently controllable light uses a default profile (as mentioned, the central controller can later upload a different profile). At a time t2, the independently controllable light can perform sensor calibrations. Thereafter, the independently controllable light can enter a steady state mode in which particular sensed events can trigger adjustment of the independently controllable FIG. 10 is a time-line that shows an example of a sequence of timing events during operation of an independently controllable light. As shown, a sensed event triggers the light adjustment which initiates a fixed adjustment interval after an initial stabilization time. Embodiments include the initial stabilization time when dimming the level of the light, and is potentially set to zero (not included) when increasing the level of the light. For this embodiment, a random time delay is initiated at the same time as the fixed adjustment interval. The random time delay is very useful when more than one of the independently controllable lights is located proximate to each other. The random time delay ensures that the proximate lights adjust their light levels at different times, preventing oscillations in which each light is adjusting for the other and also ensures uniform distribution of lighting.

After the random delay time, the light level is controllably adjusted. The adjustments continue until the target level of light has been reached. This can include any number of fixed adjustment cycles. Thereafter, the changed damping interval is included to damp or filter the changes in the light level. The damping interval can be skipped if the lights are not at an acceptable level and need to be increased. Light levels below a level can create safety issues. Therefore, the logic errs on the side of safety. Alter the duration of the change damping interval, a next sensed triggering causes the entire cycle to repeat.

The fixed adjustment interval introduces gradual changes in light levels and also allows proximate lights to effect gradual changes in a fair fashion. Multiple lights reacting to the same condition (for example, opening a blind and allowing sunlight to reach multiple lights) react at different times (due to the random delay) and have similar chances (Steps) to affect the desired target light change. The gradual changes in light levels do not distract occupants in neighboring areas.

The fixed change damping interval is introduced to prevent occupants within, for example, a room being lighted by the lights, from being irritated by continuous changes in condition that affect the lights. For example, on a partially cloudy day as the sun goes behind clouds and the light intensity sensed by the lights changes frequently, the occupant may be irritated with continuous brightening and dimming of lights. In this example, the logic would keep the lights at the brighter level to keep productivity high (that is, less irritating).

The initial stabilization time is used to filter transient increases in perceived light levels. This might happen, for example, if a person with white clothing is close to the light sensor, or for example, if external car headlights are received by the sensor causing an increase in its perceived light level.

Figure 11:
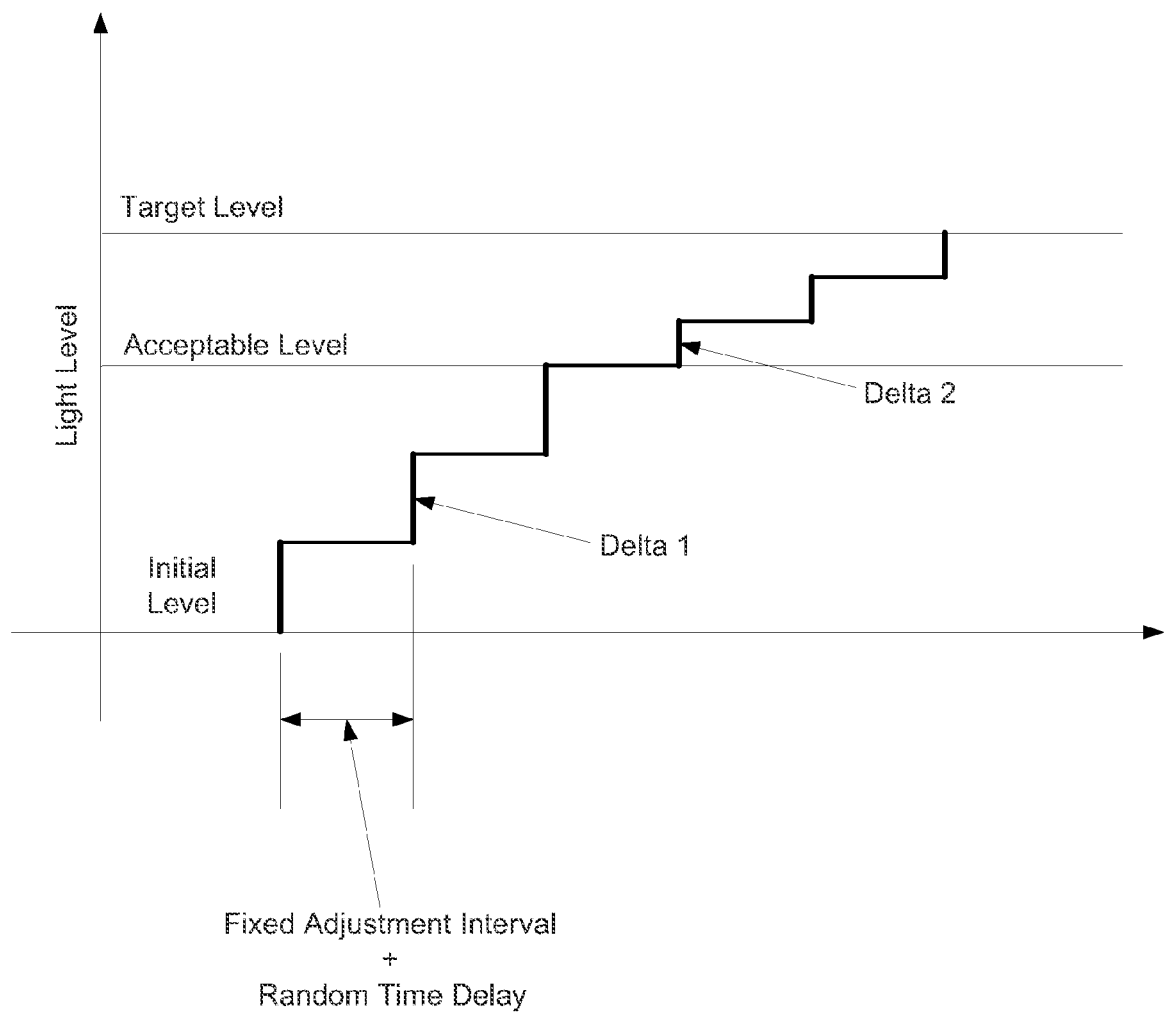
FIG. 11 is a time-line that shows an example of a sequence of events while an independently controllable light is increasing its light level.

FIG. 11 is a time-line that shows an example of a sequence of events while an independently controllable light is increasing its light level. As shown, the light level of the light is at an initial level at the point a triggering event is sensed or detected. The light level is then adjusted to a target level. The adjustment initially can include a level adjustment step size (delta 1) that is larger if the actual lighting level is below an acceptable level. Once the actual lighting level exceeds the acceptable level, the level adjustment step size (delta 2) can be deceased. The effect being that the light level changes more rapidly when increasing and the difference between the target and the present light level is still large. That is delta 1 is greater than delta 2. Note that as previously mentioned, the time between level changes is the fixed adjustment interval plus the random time delay.

Figure 12:
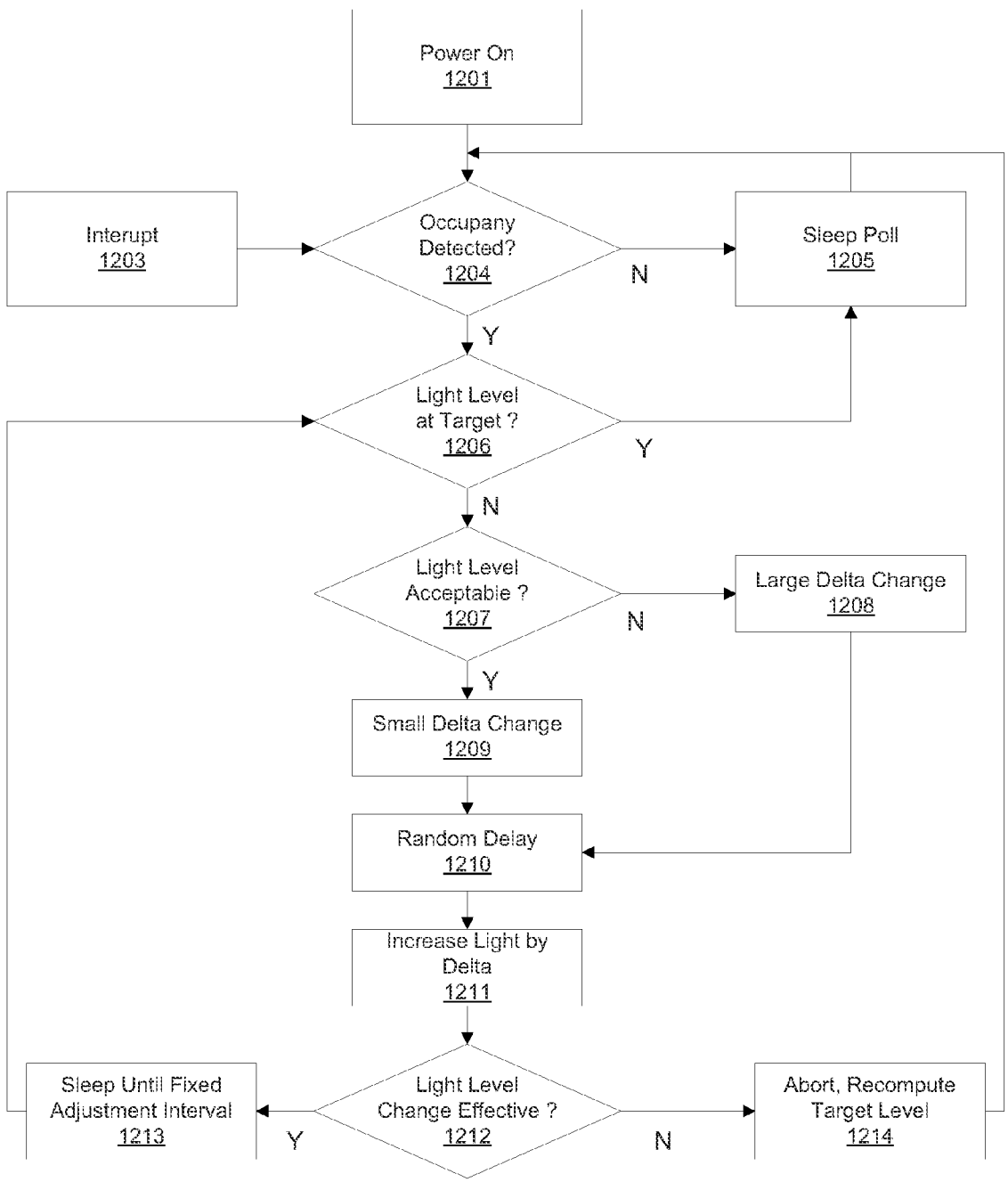
FIG. 12 is a flow chart that includes steps of an example a method of adjustably increasing a light level of a light fixture.

FIG. 12 is a flow chart that includes steps of an example of a method of adjustably increasing a light level of a light sub-system. A step 1201 includes powering on the light. A step 1202 includes detecting occupancy in the vicinity of the light. A step 1205 includes detecting occupancy by polling the motion sensor of the light at a regular interval. A step 1203 includes detecting occupancy through an interrupt from a motion sensor of the light, if occupancy is detected then a step 1206 includes checking if the light level needs to be adjusted. If light level needs adjustment, then a step 1207 includes determining if the light level is at least at an acceptable level. If acceptable, then a step 1209 includes selecting a small delta for adjustment to provide a gradual change. If not at an acceptable level, then a step 1208 includes selecting a larger delta change for adjustment to provide a more rapid change. A step 1210 includes introducing a random delay time. A step 1211 increases the light level by selected delta. A step 1212 includes checking if the light level change effected is realized. If effective, then a step 1213 includes initiating a sleep period until the next fixed adjustment interval. If not effective, then a step 1214 includes re-evaluating the current light level and starting a new cycle.

Figure 13:
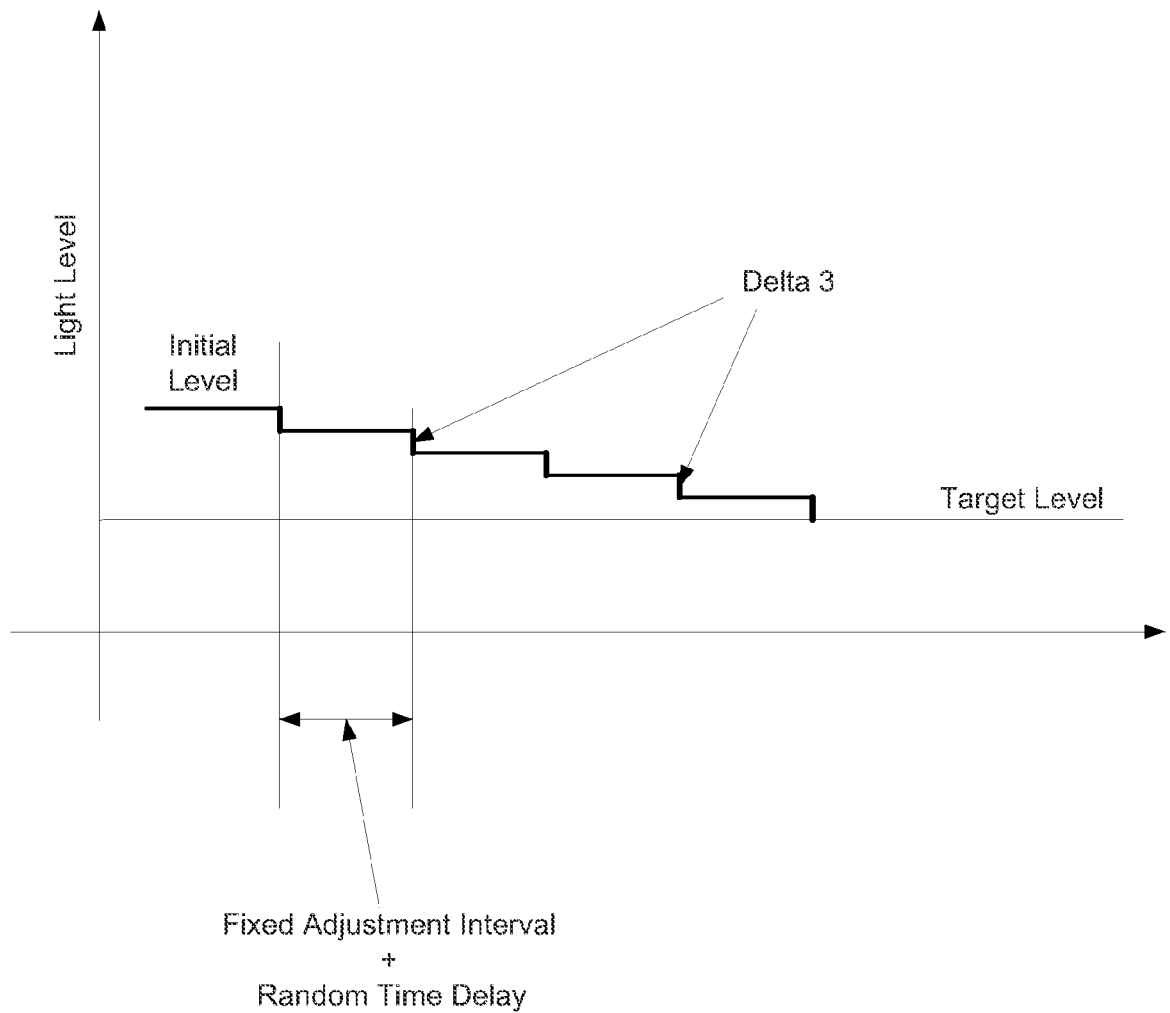
FIG. 13 is a time-line that shows an example of a sequence of events while an independently controllable light is decreasing its light level.

FIG. 13 is a time-line that shows an example of a sequence of events while an independently controllable light is decreasing its light level. As shown, the light level of the light is at an initial level at the point a triggering event is sensed or detected. The light level is then adjusted to a target level. The adjustment initially can include a level adjustment step size (delta 3). Generally, delta 3 is less than delta 1, and therefore, the lighting level increases at a greater rate than it increases.

Figure 14:
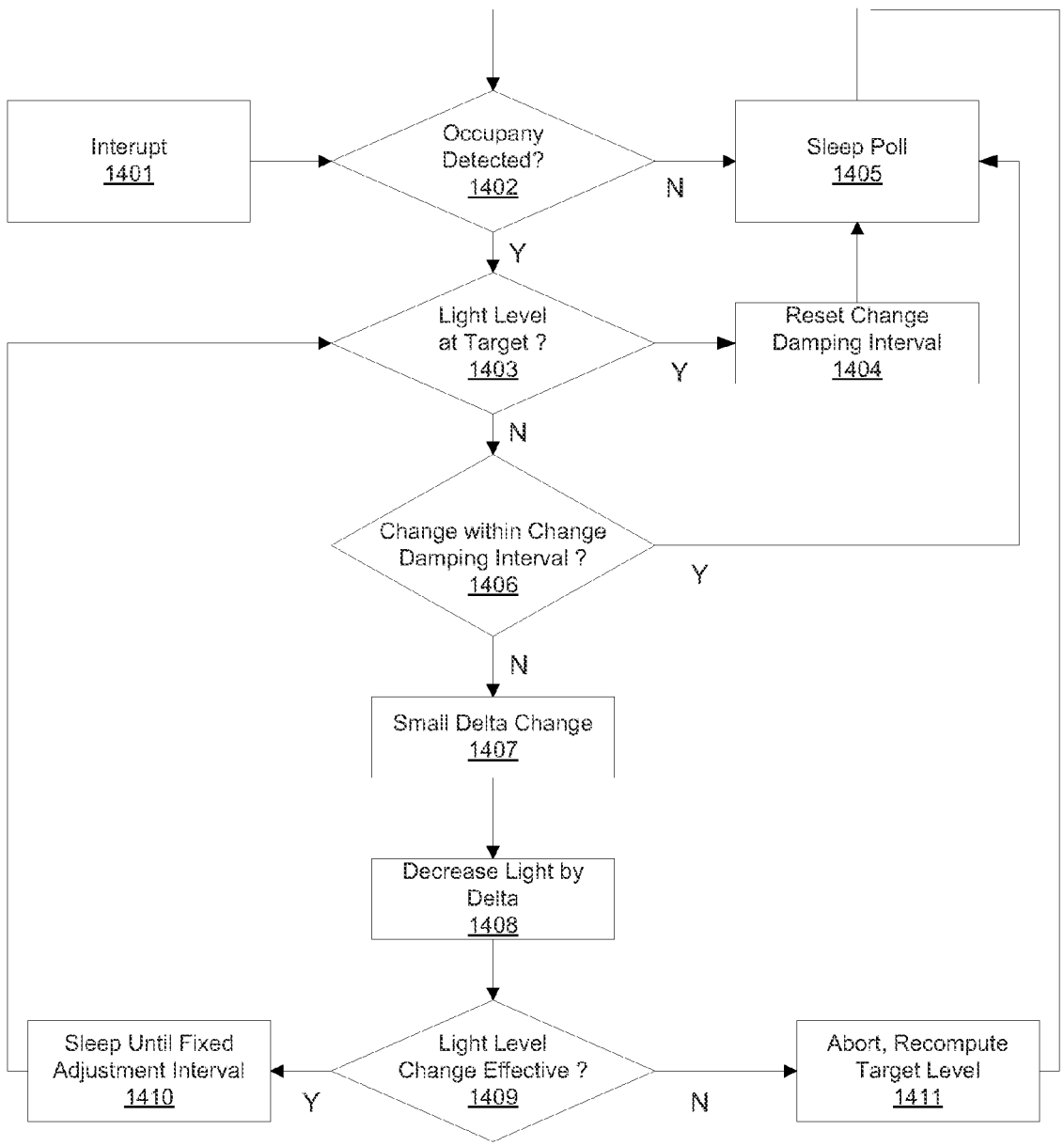
FIG. 14 is a flow chart that includes steps of an example a method of adjustably decreasing a light level of a light fixture.

FIG. 14 is a flow chart that includes steps of an example of a method of adjustably decreasing a light level of a light sub-system. A step 1402 includes detecting occupancy in the vicinity of the light. A step 1405 includes detecting occupancy by polling the motion sensor at a regular interval. A step 1401 includes detecting occupancy through an interrupt from a motion sensor. If occupancy is detected then a step 1403 includes checking if the light level needs to be adjusted. A step 1404 includes resetting the change damping interval. A step 1406 includes checking if the light level adjustment falls within the change damping interval. If so, then a step 1405 includes initiating a sleep poll interval. If not, then a step 1407 includes selecting a small delta to ensure a gradual change. A step 1408 includes decreasing the light level by the delta. A step 1409 includes checking if the light level change effected is realized. If effective, a step 1410 includes initiating a sleep cycle until the next fixed adjustment interval. If not effective, then a step 1411 includes re-evaluating the current light level and starting a new cycle.

Figure 15:
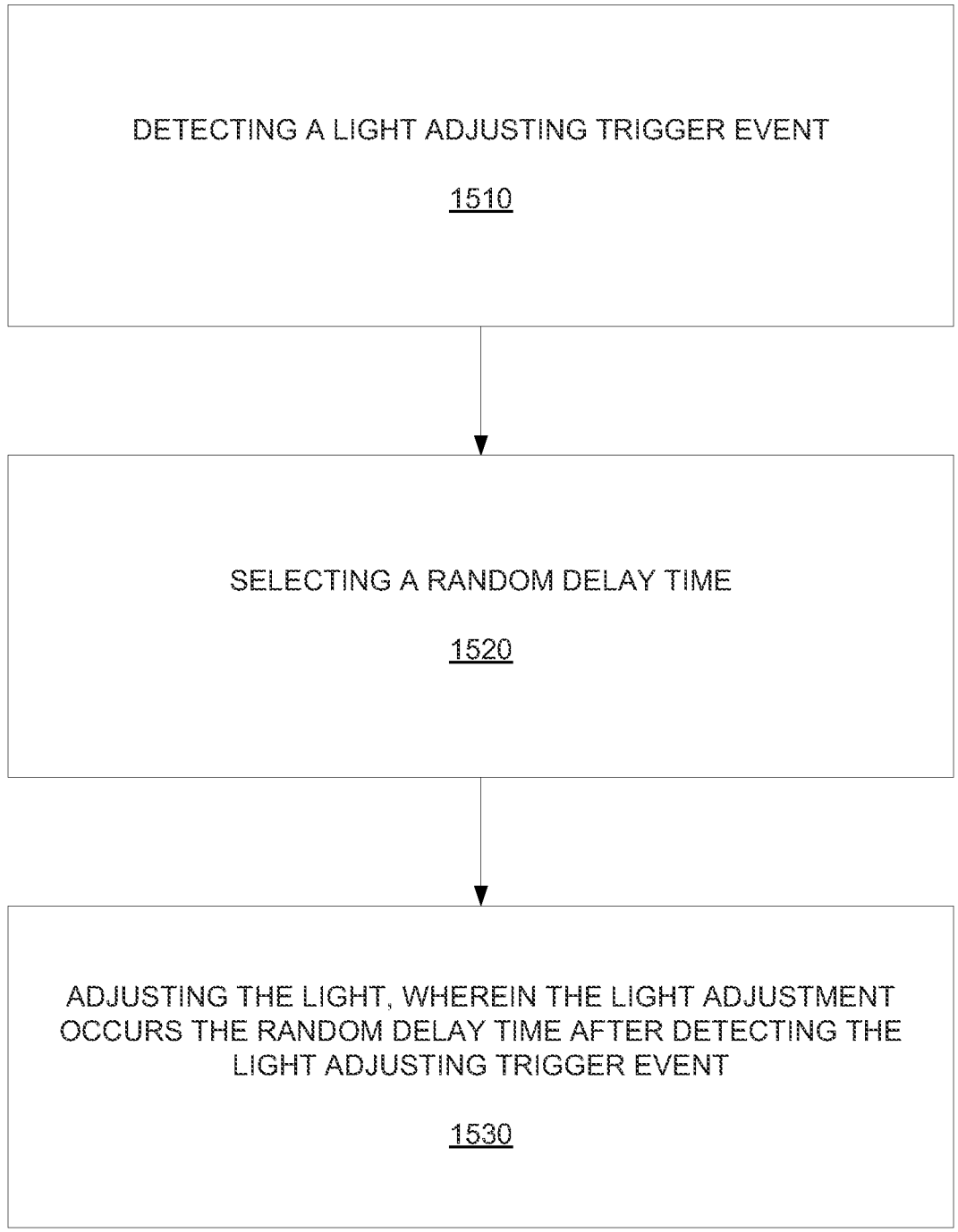
FIG. 15 is a flow chart that includes an example of a method of controlling a light fixture.

FIG. 15 is a flow chart that includes an example of a method of controlling a light. A first step 1510 includes detecting a light adjusting trigger event. A second step 1520 includes selecting a random delay time. A third step 1530 includes adjusting the light, wherein the light adjustment occurs the random delay time after detecting the light adjusting trigger event.

For an embodiment, detecting a light adjusting trigger event includes sensing a light level change greater than a change threshold. That is, for example, sensing a light level different from a target light level by an amount that is greater than a difference threshold. Additionally or alternatively, the light adjusting trigger event can include sensing a change in room occupancy state, user input, or a state of emergency. For other embodiments, detecting a light adjusting trigger event includes detecting at least one of a change in time of day, a day of a week, a day of a year, a change in weather. For other embodiments, detecting a light adjusting trigger event includes receiving a demand response request or a real-time pricing request from, for example, the central controller.

An embodiment includes adjusting the light only once per a fixed adjustment interval. Further, the light is adjusted the random delay time after the start of the fixed adjustment interval. This can further include periodically polling throughout the fixed adjustment interval to confirm that a state change that caused the light adjusting trigger event persists. If the state change that caused the trigger no longer persists, then a new light triggering event can be initiated.

As previously described, a light profile can be received that includes at least one light parameter. The at least one lighting parameter can influence the change threshold (either a percentage or an absolute value), the target light level, and/or the difference threshold (as either a percentage of an absolute value). Additionally, embodiments include the at least one light parameter influencing the fixed adjustment interval and/or the change damping interval.

Embodiments include factors influencing the light profile. For example, the light profile can be based at least in part on the type of room or area. The light profile can be adaptively updated based at least in part on at least one of a productivity versus efficiency (PVE) scale, a daylight likelihood assessment, time of day, day of week/holidays, weather, emergency, demand response requests, real-time-pricing events.

An embodiment includes the light parameters being configured such that a light level higher than the target light level is handled differently than a light level that is lower than the target light level. Adjusting the light includes adjusting a light intensity of the light by an increment step, wherein the incremental step is a fraction of a difference between a present light intensity and a target light intensity.

For an embodiment, if the target is greater than the present light intensity, then the light intensity is adjusted at a faster rate if the present light intensity is below an acceptable level, and at a slower rate if the present light intensity is greater than the acceptable level. If the target is less than the present light intensity, then the light intensity is adjusted at a slower rate.

More specific embodiment includes after one incremental adjustment, checking if the measured light level remains such that further adjustment is necessary and, if so, adjusting the light a new random delay time after the remainder of the fixed adjustment interval and repeating this process until the measured light level is no longer such that further adjustment is necessary.

Although specific embodiments have been described and illustrated, the described embodiments are not to be limited to the specific forms or arrangements of parts so described and illustrated. The embodiments are limited only by the appended claims.

What is claimed:

1. A lighting control sub-system comprising
    a luminaire;
    a controller coupled to the luminaire;
    a sensor coupled to the controller, the sensor generating a sensed input;
    a communication interface, the communication interface coupling the controller to an external device;
    wherein the controller is operative to:
        control a light output of the luminaire based at least in part on the sensed input;
        communicate at least one of state or sensed information to the external device; and
        receive a plurality of lighting control sub-system profiles;
        wherein an active profile of the plurality of lighting control sub-system profiles is adaptively updated.

2. The sub-system of claim 1, wherein the controller is further operative to receive information from the external device, wherein the received information influences a current state of the lighting control sub-system, or the received information includes parameters that influence a future state of the lighting control sub-system.

3. The sub-system of claim 1, wherein the controller is further operative to receive information from the external device, wherein the received information influences at least one of the plurality of lighting control sub-system profiles.

4. The sub-system of claim 3, wherein the at least one of the lighting control sub-system profiles comprises parameters, wherein the parameters are adaptively updated.

5. The sub-system of claim 1, further comprising the external device adding, replacing or deleting one or more profiles of the plurality of lighting control sub-system profiles.

6. The sub-system of claim 1, wherein the external device comprises a central controller, another lighting control sub-system, a logical group controller, or a terminal.

7. The sub-system of claim 1, further comprising a plurality of sensors, wherein the controller is operative to control the light output based on a combination of sensed inputs of the plurality of sensors.

8. The sub-system of claim 7, further comprising the controller operative to control the light output based on the combination of one or more of the sensed inputs and a lighting schedule.

9. The sub-system of claim 1, wherein further comprising the controller operative to receive a lighting control configuration.

10. The sub-system of claim 9, wherein the controller receives the lighting control configuration from a system operator.

11. The sub-system of claim 9, wherein the controller receives the lighting control configuration from a central controller, thereby allowing a system user to manage the lighting control configuration.

12. The sub-system of claim 1, further comprising the controller operative to collect sensor values over time based on at least the sensed input.

13. The sub-system of claim 12, further comprising the controller operative to communicate the collected sensor values to the external device.

14. The sub-system of claim 1, further comprising the controller operative to report past operating characteristics of the sub-system.

15. The sub-system of claim 1, wherein the sensor comprises a power monitoring unit operative to measure power usage of the lighting control sub-system.

16. The sub-system of claim 1, further comprising the controller operative to communicate with other sub-systems, and identify logical groups of two or more sub-systems.

17. The sub-system of claim 16, wherein identifying logical groups comprises at least the controller and at least one of the other sub-systems auto-determining the logical group.

18. The sub-system of claim 16, wherein at least one of the logical groups includes a motion sensing group.

19. The sub-system of claim 16, wherein at least one of the logical groups includes an ambient light group.

20. The sub-system of claim 16, wherein at least one of the logical groups includes a logical switch group.

21. The sub-system of claim 16, wherein at least one of the logical groups includes a logical temperature group.

22. The sub-system of claim 16, further comprising the controller operative to control the light output based on a sensor signal of a sensor of another sub-system of a common logical group.

23. The sub-system of claim 1, further comprising the controller operative to identify an emergency condition, and initiate an emergency mode.

24. A lighting control sub-system comprising
a luminaire;
a controller coupled to the luminaire;
a sensor coupled to the controller, the sensor generating a sensed input;
a communication interface, the communication interface coupling the controller to an external device;
wherein the controller is operative to:
control a light output of the luminaire based at least in part on the sensed input;
communicate at least one of state or sensed information to the external device;
collect sensor values over time based on at least the sensed input; and
identify problems of operation of the lighting control sub-system based on the collected sensor values, and to report the identified problems of operation to the external device.

25. A lighting control sub-system comprising
a luminaire;
a controller coupled to the luminaire;
a sensor coupled to the controller, the sensor generating a sensed input;
a communication interface, the communication interface coupling the controller to an external device;
wherein the controller is operative to:
control a light output of the luminaire based at least in part on the sensed input;
communicate at least one of state or sensed information to the external device;
measure power usage of the lighting control sub-system; and
communicate the measured power usage of the sub-system to the external device.

26. A lighting control sub-system comprising
a luminaire;
a controller coupled to the luminaire;
a sensor coupled to the controller, the sensor generating a sensed input;
a communication interface, the communication interface coupling the controller to an external device;
wherein the controller is operative to:
control a light output of the luminaire based at least in part on the sensed input;
communicate at least one of state or sensed information to the external device; and
communicate with other sub-systems, and identify logical groups of two or more sub-systems;
wherein sub-systems of a common logical group communicate to each other when a sensor of one of the sub-systems of the logical group has failed.

27. A lighting control sub-system comprising
a luminaire;
a controller coupled to the luminaire;
a sensor coupled to the controller, the sensor generating a sensed input;
a communication interface, the communication interface coupling the controller to an external device;
wherein the controller is operative to:
control a light output of the luminaire based at least in part on the sensed input;
communicate at least one of state or sensed information to the external device;
identify an emergency condition, and initiate an emergency mode; and
confirm the identification of the emergency mode, comprising the controller initiating communication with a non-emergency device, and confirming the identified emergency condition if the initiated communication is not successful.

28. A lighting control system comprising
a plurality of sub-systems,
each sub-system comprising:
a luminaire;
a controller coupled to the luminaire;
at least one sensor coupled to the controller, the at least one sensor generating a sensed input;
a communication interface, the communication interface coupling the controller to an external device;
wherein the controller is operative to:
control a light output of the luminaire; and
communicate at least one of state or sensed information to at least one of a central controller or another sub-system;
receive a demand response from an external power company, and adaptively communicate to the plurality of sub-systems to operate in a reduced power mode.

29. A lighting control system comprising:
a plurality of sub-systems,
two or more sub-systems capable of acting as a group and each sub-system capable of independent action,
each sub-system comprising:
a luminaire;
a controller electrically connected to said luminaire, said controller operative to control the light output of said luminaire and to communicate with other sub-systems; and,
at least one sensor connected to said controller;
wherein sub-systems of a common logical group communicate to each other when a sensor of one of the sub-systems of the common logical group has failed.

30. The system of claim 29, further comprising the controller operative to communicate with other sub-systems, and identify logical groups of two or more sub-systems.

31. The system of claim 30, further comprising the controller operative to control the light output based on a sensor signal of a sensor of another sub-system.

32. The system of claim 30, wherein identifying logical groups comprises at least the controller and at least one of the other sub-systems auto-determining the logical group.

33. The system of claim 30, wherein at least one of the logical groups includes a motion sensing group.

34. The system of claim 30, wherein at least one of the logical groups includes an ambient light group.

35. The system of claim 30, wherein at least one of the logical groups includes a logical switch group.

36. The system of claim 30, wherein at least one of the logical groups includes a logical temperature group.

37. A lighting control system comprising:
a central controller;
a plurality of sub-systems, wherein each sub-system is capable of independent action and
each sub-system capable of acting responsive to said central controller, each sub-system comprising:
a luminaire;
a controller coupled to the luminaire;
at least one sensor coupled to the controller, the at least one sensor generating a sensed input;
a communication interface, the communication interface coupling the controller to at least one of the central controller or another sub-system;
wherein the controller is operative to:
control a light output of the luminaire; and
communicate at least one of state or sensed information to at least one of the central controller or another sub-system;
receive sensed values and sub-system state information for one or more of the plurality of sub-systems; and
aggregate and display the received sensed values of the one or more of the plurality of sub-systems.

38. The lighting control system of claim 37, further comprising the central controller operative to provide a system management of the lighting control system.

39. The lighting control system of claim 38, wherein the system management provides a user interface, allowing a user to configure operation of one or more of the plurality of sub-systems.

40. The lighting control system of claim 37, wherein the wherein the central controller is further operative to aggregate and display the received sensed values of the one or more of the plurality of sub-systems.

41. The lighting control system of claim 40, wherein the wherein central controller is further operative display summary statistics of the received sensed values over variable periods of time.

42. The lighting control system of claim 37, further comprising the central controller operative to identify a failure of emergency sub-systems, and to identify and communicate to other sub-systems operation to operate in an emergency mode.

43. The lighting control system of claim 37, further comprising the central controller operative to receive a demand response from an external power company, and adaptively communicate to the plurality of sub-systems to operate in a reduced power mode.

44. A lighting control system comprising
a plurality of sub-systems and
a central controller,
each sub-system capable of independent action,
two or more sub-systems capable of acting as a group, and
each sub-system capable of acting responsive to said central controller,
each sub-system comprising:
a luminaire;
a controller coupled to the luminaire;
a sensor coupled to the controller, the sensor generating a sensed input;
a communication interface, the communication interface coupling the controller to an external device;
wherein the controller is operative to:
control a light output of the luminaire; and
communicate at least one of state or sensed information to the external device;
wherein sub-systems of a common logical group communicate to each other when a sensor of one of the sub-systems of the common logical group has failed.

45. A lighting control system for integration with existing luminaires comprising
a controller coupled to a luminaire;
a sensor coupled to the controller, the sensor generating a sensed input;
a communication interface, the communication interface coupling the controller to an external device;
wherein the controller is operative to:
control a light output of the luminaire; and
communicate at least one of state or sensed information to the external device;
measure power usage of the lighting control sub-system; and
communicate the measured power usage of the sub-system to the external device.

* * * * *